United States Patent [19]

Kingsley et al.

[11] Patent Number: 4,506,301
[45] Date of Patent: Mar. 19, 1985

[54] MULTIPLE MODE RASTER SCANNER

[75] Inventors: William Kingsley; James C. Stoffel, both of Rochester; John F. Moreland, Jr., Fairport; Ronald G. Matteson, Walworth; Douglas G. Wiggins, Penfield; Robert F. Allis, Rochester, all of N.Y.

[73] Assignee: Xerox Corporation, Stamford, Conn.

[21] Appl. No.: 84,209

[22] Filed: Oct. 12, 1979
(Under 37 CFR 1.47)

[51] Int. Cl.³ .............................................. H04N 1/40
[52] U.S. Cl. ................................. 358/280; 358/283; 358/287; 358/294
[58] Field of Search .............. 358/256, 258, 260, 263, 358/280, 282, 283, 284, 299, 287; 340/146.3 AG; 382/50

[56] References Cited

U.S. PATENT DOCUMENTS

| | | | |
|---|---|---|---|
| Re. 29,067 | 12/1976 | Watson | 358/294 |
| 3,229,033 | 1/1966 | Artzt | 178/6 |
| 3,272,918 | 9/1966 | Koll et al. | 358/287 |
| 3,286,026 | 11/1966 | Greutman et al. | 178/6.8 |
| 3,622,698 | 11/1971 | Richeson, Jr. | 358/284 |
| 3,752,558 | 8/1973 | Lloyd | 350/6 |
| 3,761,610 | 9/1973 | Krallinger et al. | 358/280 |
| 3,849,592 | 11/1974 | Rosenheck | 178/6 |
| 3,962,681 | 6/1976 | Requa et al. | 340/146.3 H |
| 4,004,079 | 1/1977 | Boston | 358/256 |
| 4,075,663 | 2/1978 | Wellendorf | 358/283 |
| 4,092,632 | 5/1978 | Agulnek | 340/146.3 F |
| 4,110,795 | 8/1978 | Spencer | 358/260 |
| 4,193,092 | 3/1980 | Stoffel | 358/260 |
| 4,194,221 | 3/1980 | Stoffel | 358/280 |
| 4,275,450 | 6/1981 | Potter | 358/287 |

OTHER PUBLICATIONS

Gruodis et al–Limited Resolution Facsimile System–IBM Tech. Disclosure Bulletin–vol. 6, #40, Sep. 1963, pp. 139–141.

Primary Examiner—Joseph A. Orsino, Jr.
Attorney, Agent, or Firm—Frederick E. McMullen

[57] ABSTRACT

An image input terminal (IIT) with automatic document handler for feeding documents to be scanned into registered position on the IIT platen. The IIT includes a pair of multi-element scanning arrays with cooperating scan lamp and optics on a movable carriage disposed in scanning relationship with the platen. Analog image signals generated by the scanning arrays are initially processed in separate channels and then combined into a serial stream. The stream of analog image signals may optionally be thresholded or screened to provide binary level image signals or converted to multi-bit gray scale. A control system including microprocessor provides timing and control signals for synchronizing operation of the scanning carriage, document handler, and image signal reading and processing together with electronic crossover between arrays to avoid loss of data, automatic signal gain and deletion of bad image signals or pixels. On board array alignment apparatus permits adjustment of array focus, skew, height, position and overlap.

12 Claims, 40 Drawing Figures

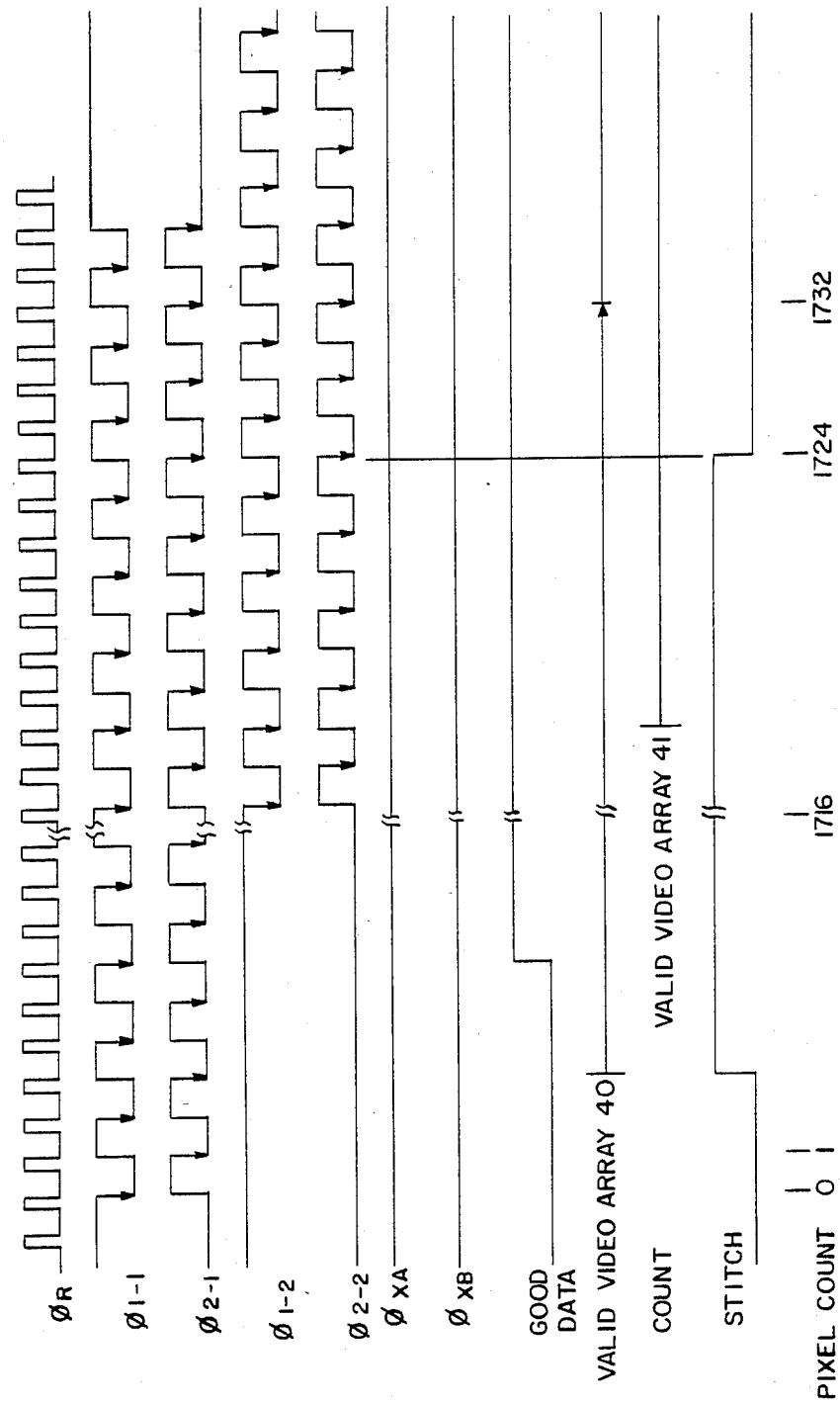

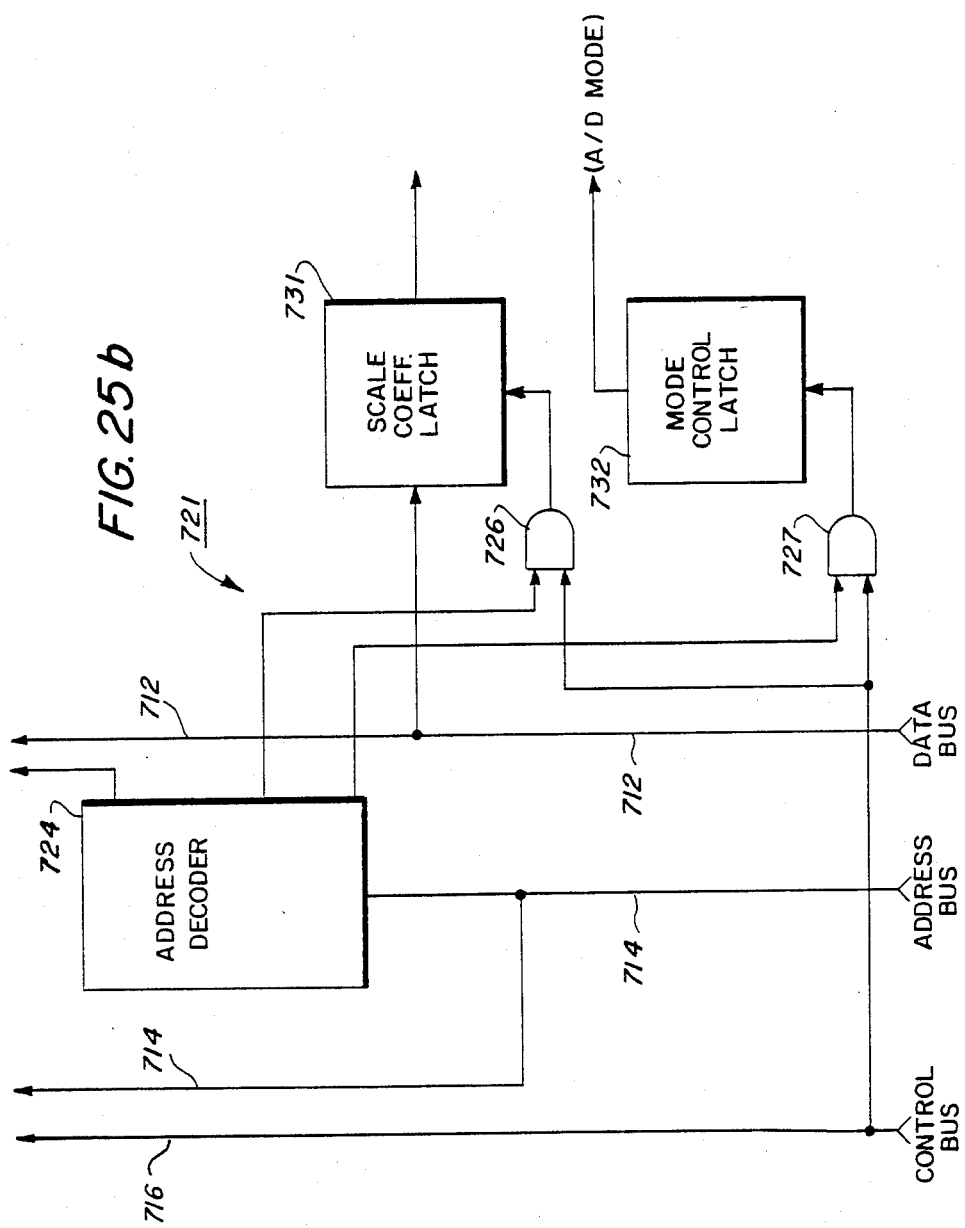

INPUT / OUTPUT OF A TWO STAGE BRM

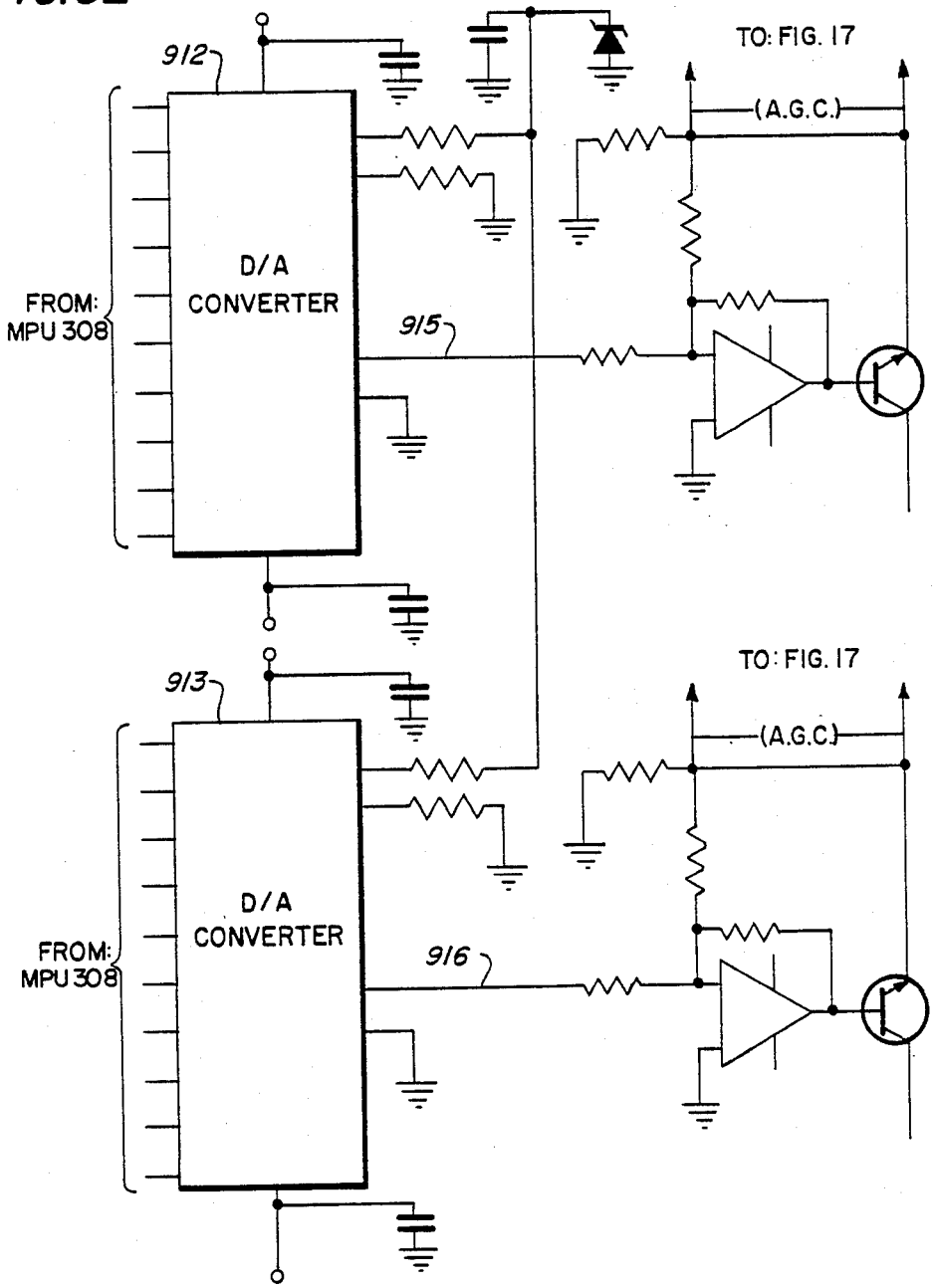

FIG. 35
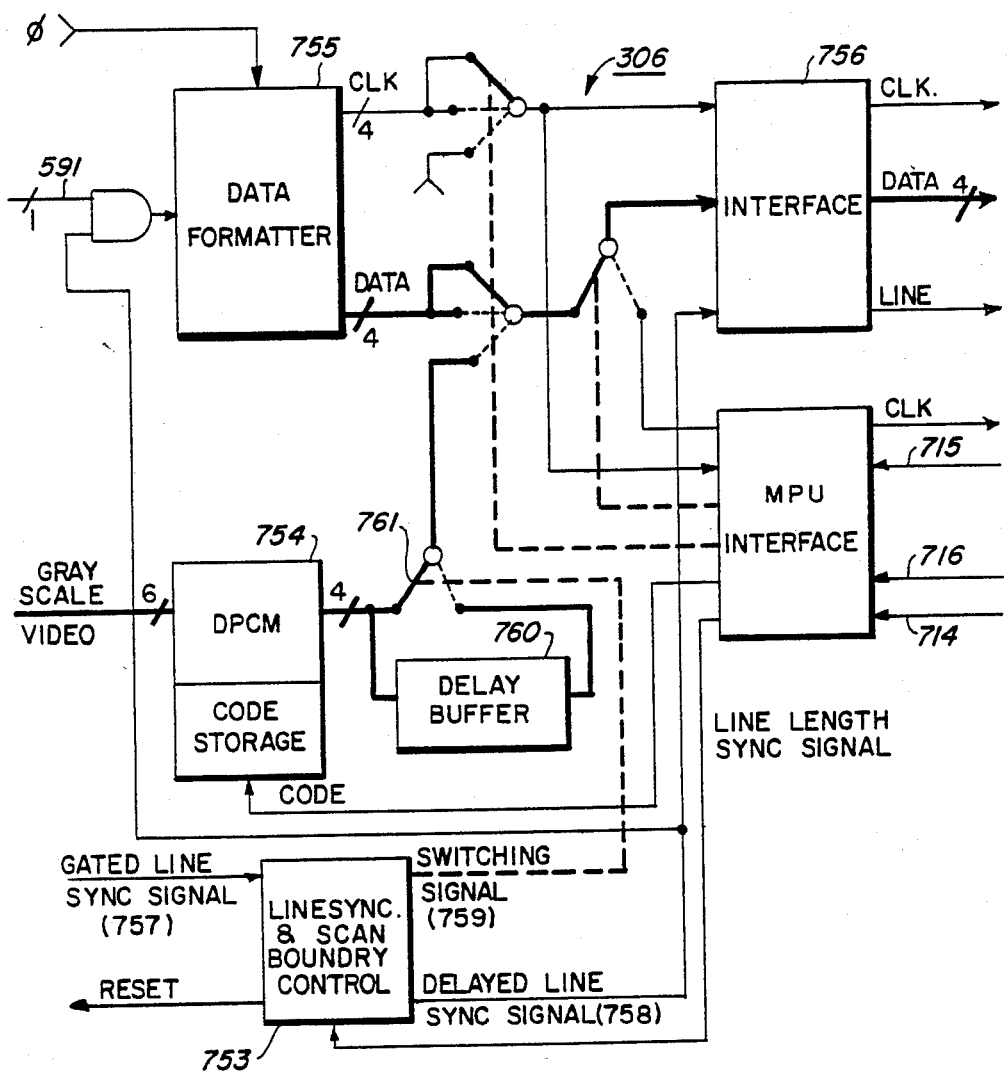
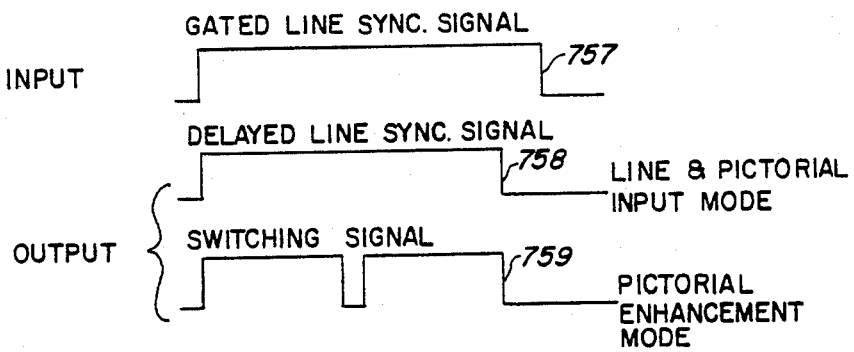

MULTIPLE MODE RASTER SCANNER

This invention relates to a raster scanning apparatus and method, and more particularly to a multiple mode raster input scanning apparatus and method for processing line, halftone and continuous tone originals.

For practical use, a raster input scanner must be capable of handling all the various types of originals that may be presented to it. Generally, originals may be classified as those comprised essentially of lines of text, as for example a letter, and pictorial originals. Pictorial originals in turn may be categorized generally as either continuous tone originals, typically a photograph, and halftone originals. The latter is typified by newspaper pictures. In addition of course, any one original may comprise various combinations of line, halftone, or continuous material.

For effective processing and ultimate reproduction with minimal errors and distortion, each of the aforedescribed original types require somewhat different processing, tailored to the inherent physical limitation of the particular original. For example, line copy may during processing be simply thresholded whereas continuous tone originals, for optimum results, require screening. And halftone originals, which have already been screened, sometimes in accordance with unknown screen parameters, require yet different handling and processing.

This invention relates to a raster input scanner comprising in combination: scanning means for scanning originals, the scanning means providing analog image signals representative of the original image scanned; processing means for processing the image signals to provide selectively binary or digital signal output; the processing means including thresholding means for thresholding the image signals to provide the binary signal output and A/D conversion means for converting the image signals to provide the digital signal output.

This invention further relates to a method of processing image bearing originals to provide a signal output representative of the image on the original comprising the steps of: scanning the original to provide analog image signals representative of the image on the original; where the image is made up predominantly of lines or continuous tones, processing the image signals to provide a binary signal output representative of the image; where the image is made up predominantly of halftones, processing the image signals to provide a digital signal output representing the gray levels of the image, and correlating the binary signal output with the digital signal output to provide image signals at a uniform level irrespective of the image type.

In the Drawings:

FIGS. 16a and 16b are timing diagrams showing the time/sequence operation of the scanning arrays;

FIGS. 25a and 25b are schematic views of the IPM screening circuits;

FIG. 32 is a schematic view of the automatic gain (AGC) control logic;

FIG. 35 is a block diagram of the video output board (VOB); and

GENERAL DESCRIPTION

Figure 1:
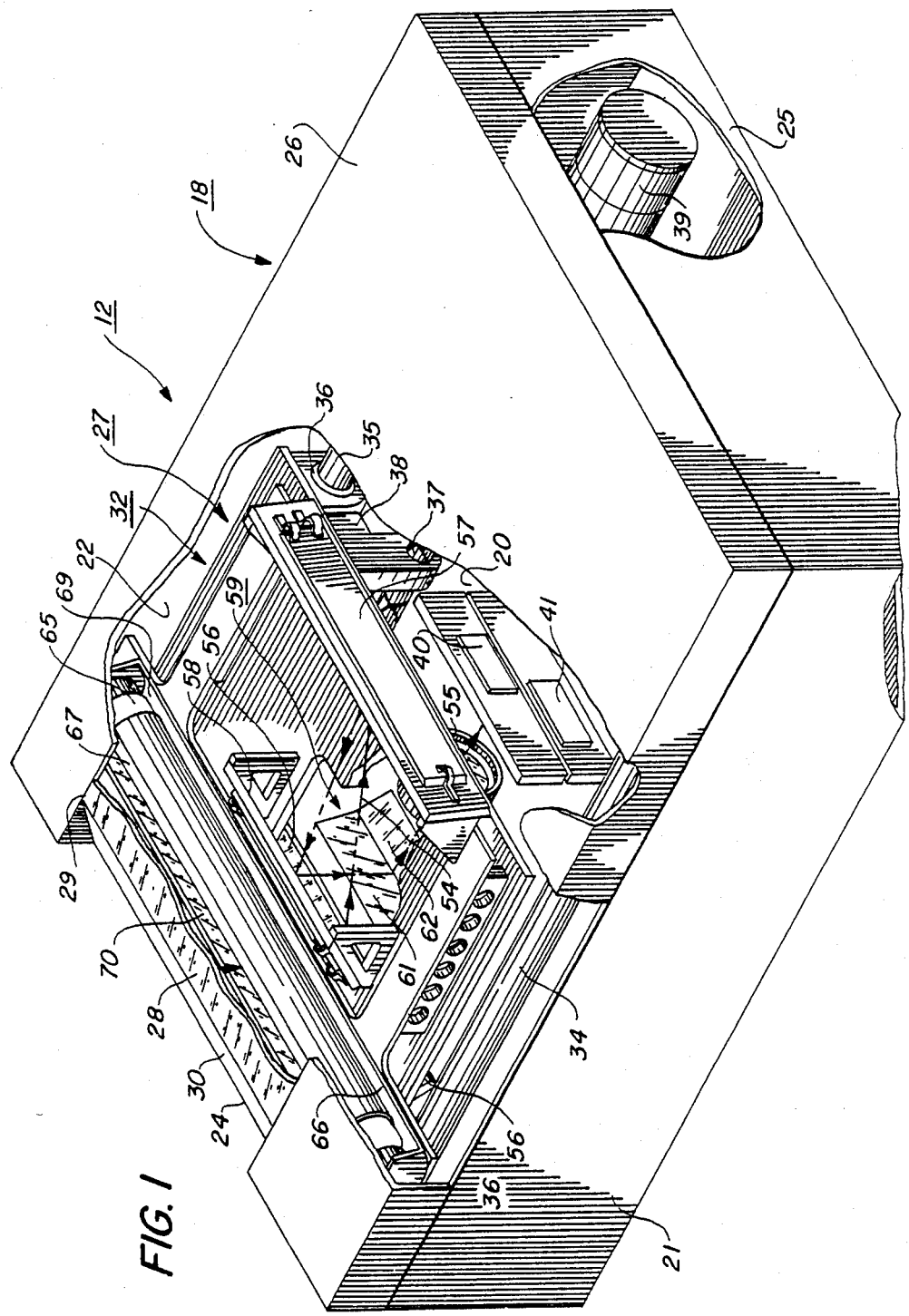
FIG. 1 is an isometric view of the Image Input Terminal (IIT) of the present invention.

For purposes of description, the image input terminal 10 (hereinafter IIT) is conveniently divided into scanner section 12 for raster scanning an original document (FIGS. 1-7), a document handler 14 for bringing documents 8 to be scanned into registered position on platen 28 of scanner 12 (FIGS. 8-13), and control processing section 16 containing the various electronic components and circuits for controlling operation of scanner 12 and document handler 14, and for processing the image signals generated (FIGS. 14–36).

Referring particularly to FIGS. 1–4, scanner 12 includes a frame or housing 18 consisting of base 20, side walls 21,22, front and rear walls 24,25, and top wall 26. Base 20 and walls 21,22, 25,26 cooperate to form an interior chamber or compartment 27 within which a movable scan carriage 32 is disposed. Base 20 and walls 21, 22, 24, 25, 26 of housing 18 are planar, top wall 26 including a generally rectangular transparent glass or platen 28 through which the original document 8 to be scanned is viewed.

Document handler 14 normally overlays platen 28, the document handler 14 serving to bring one document at a time forward into registered position on platen 28. Following scanning of the document, the document is removed by document handler 14 to clear platen 28 for the next document as will appear more fully herein. Where document handler 14 is not used, the document to be scanned, i.e. a book (See FIG. 13) is manually placed on platen 28 in registered position. Following completion of scanning, the document is manually removed. In this mode of operation, document handler 14 is swung to an out of the way position or removed. See FIG. 11. Preferably where document handler 14 is removed, a suitable platen cover (not shown) is provided to prevent glare and permit platen 28 to be covered when not in use to protect the surface thereof from scratches, dust, etc.

SCANNER SECTION

The portion 30 of top wall 26 between the end of platen 28 and front wall 24 is preferably beveled or sloped downwardly to provide a supporting surface facilitating scanning of bound originals such as books. When scanning bound originals, document handler 14 is placed in an out of the way position or removed entirely.

Scan carriage 32 is supported for longitudinal movement (in the Y direction) within compartment 28 of scanner 18 by means of parallel carriage support rods 34,35. Carriage support rods 34,35 are carried in front and rear walls 24,25 of housing 18. To support carriage 32 on rods 34,35, front and rear journals or bearings 36 are provided on the sides of carriage 32, bearings 36 slidably riding on rods 34,35.

To impart scanning motion to carriage 32, a drive screw 37 is threadedly engaged with carriage 32 via nut 38. Reversible drive motor 39, which is supported on base 20 of housing 18 adjacent rear wall 25, drives screw 37 in either a clockwise (scan) or counter clockwise (return) direction to move carriage 32 longitudinally along carriage support rods 34,35.

A pair of scanning or image arrays 40,41, which may for example, comprise Fairchild Model 121 H CCD Chips, are supported on carriage 32 adjacent one end thereof in predetermined spaced relation such that array 40 is above and to one side of array 41. Arrays 40,41 each comprise a series (i.e. 1728) of individual photosensitive elements effective when exposed to the document being scanned to generate a signal whose potential is proportional to the reflectance of the image area seen by the array element.

An optical system consisting of lens 55, scan mirror 56, and reflecting mirrors 57,58,59, cooperate to form an optical path 54 through which image rays reflected from a document on platen 28 are transmitted to arrays 40,41. Lens 55 is mounted substantially centrally on carriage 32 in preset spaced opposing relation to arrays 40,41. Mirrors 56,57,58,59, which are generally rectangular in configuration, are mounted on carriage 32 in preselected angular dispositions to provide a folded optical path between platen 28 and lens 55. Mirror 59 has two facets 61,62 disposed at predetermined angles with respect to one another such that mirror 59 serves as an object beam splitter to split the projected image into two images, one for each array 40,41. During scanning, image rays reflected from the document on platen 28 pass downwardly to scan mirror 56 and from scan mirror 56 through mirrors 57,58,59 to lens 55 and arrays 40,41.

To illuminate platen 28 and any document thereon, an elongated exposure lamp 65 is provided on carriage 32. Lamp 65 which extends in the direction generally perpendicular to the direction of movement of scan carriage 32, is disposed in a generally cylindrical lamp housing 66. A slit-like exposure aperture 67 in lamp housing 66 extends across the width of platen 28. The interior walls 69 of lamp housing 66 are preferably polished to reflect light from lamp 65 toward aperture 67 and platen 28.

A reflector 70 is provided opposite aperture 67 to further reflect light emitted by lamp 65 onto platen 28 adjacent the image scan line. Reflector 70, which is disposed on the opposite side of optical path 54, is pivotally supported by pins 72 on carriage 32. Spring 73 biases reflector 70 in a counter clockwise direction into engagement with fixed locating stop 74 on carriage 32. The upper surface of reflector 70 is beveled at 75 and cooperates with the downwardly sloping interior portion 30 of top wall 26 on movement of carriage 32 to a home position to pivot or swing reflector 30 forwardly (to the dotted line position shown in FIG. 4).

During operation, lens 55 and mirrors 56,57, 58,59, and exposure lamp 65 and reflector 70, move (in the Y direction shown by the solid line arrow of FIGS. 2 and 3) from the carriage home position to the end of scan 81 to scan the document 8 on platen 28. Light from exposure lamp 65 illuminates a line-like area i.e. the scan line, across the width of platen 28 (in the X direction shown by the dotted line arrow of FIG. 3). As carriage 32 moves under platen 28, the line-like illuminated area travels the length of platen 28. Following completion of the scan, carriage 32 returns to the home position.

Figure 5:
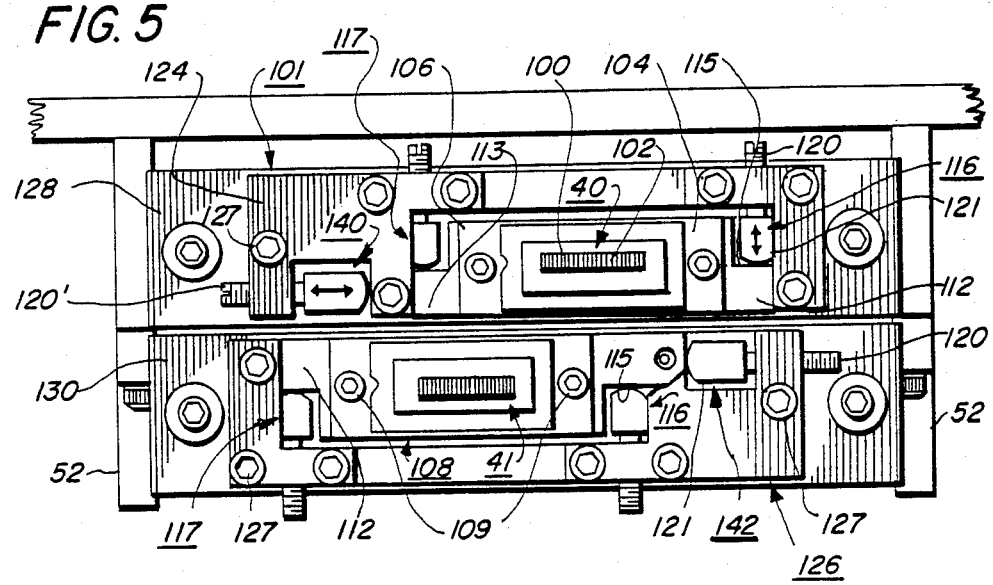
FIG. 5 is an end view in section of the mounting mechanism for the IIT scanning arrays.
Figure 6:
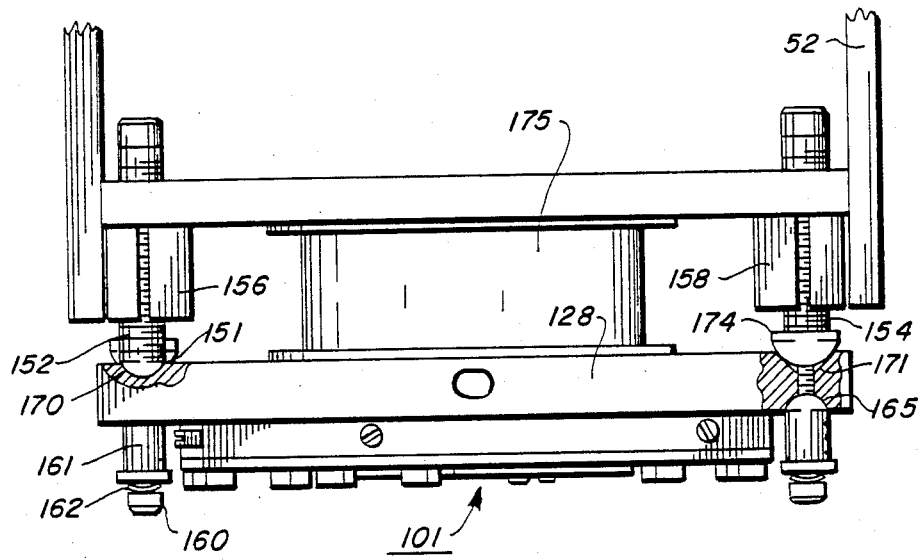
FIG. 6 is a top view in section of the scanning array support.
Figure 7:
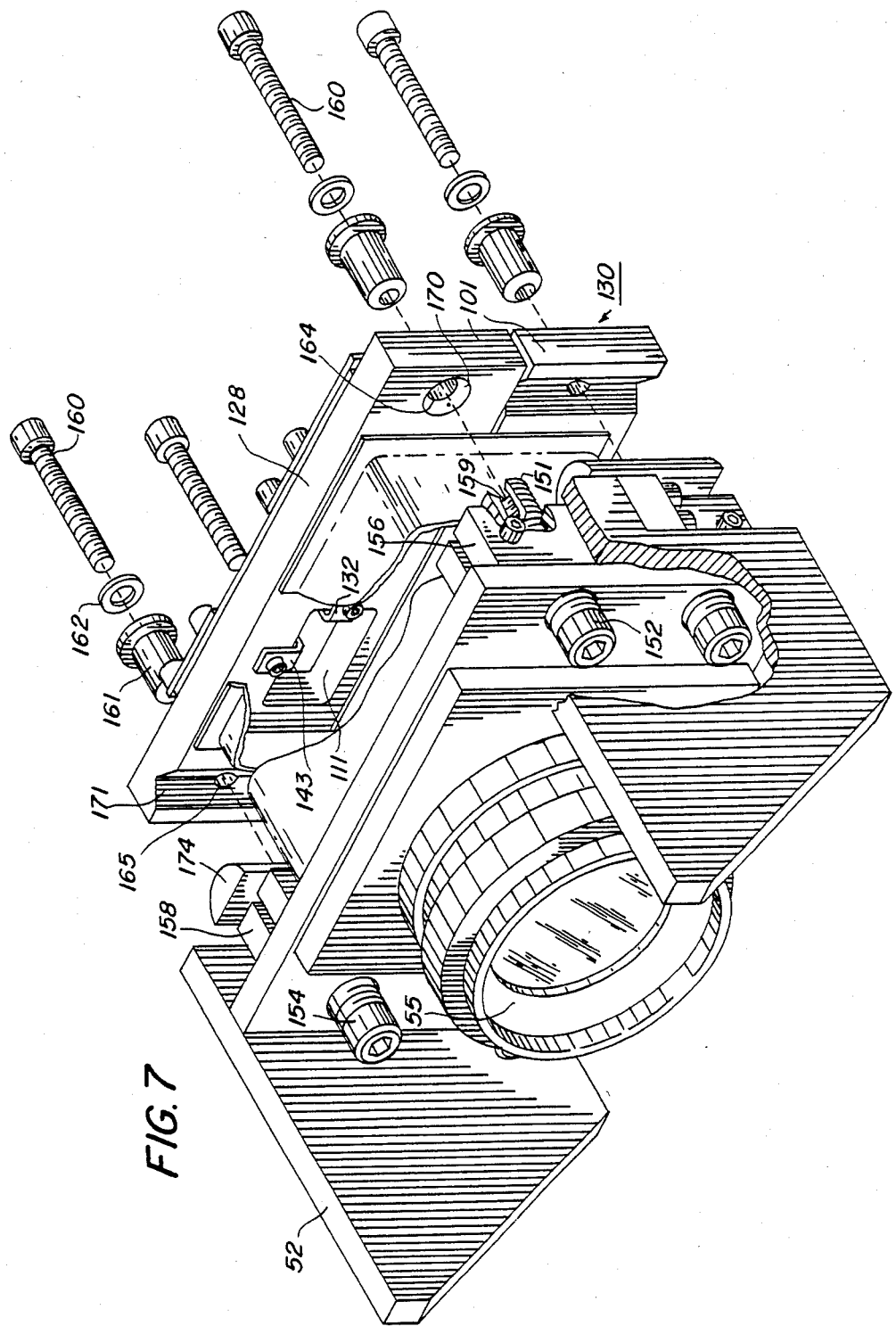
FIG. 7 is an exploded isometric view showing details of the scanning array support.

Referring particularly to FIGS. 5, 6, and 7, arrays 40,41 comprise generally rectangular chips 100, the internal photosensitive or viewing elements of which extend logitudinally thereof to form a narrow viewing window 102. An adjustable array support assembly 101 is provided for each array. Each support assembly 101 includes a chip carrier 104 to which the array chip 100 is suitably attached as by means of adhesive. Carriers 104 are in turn attached to upper and lower floating blocks 106,108 respectively as by means of screws 109.

Blocks 106,108 are generally T-shaped with a central generally rectangular aperture 111 over which the array is secured, with outwardly extending side projections 112,113. One interior face 115 of each projection 112,113 rests against an adjustable support 116,117. In the arrangement shown, upper block 106 is inverted relative to lower block 108 with the result that supports 116,117 for upper block 106 ride against the upper side 115 of projections 112,113 of block 106 while the supports 116,117 for lower block 108 ride against the lower surface 115 of projections 112,113 and block 108. Supports 116, 117 each comprise a threaded member 120 bearing a contact pad 121 at one end thereof for engagement with the surface 115 of the block 106,108 associated therewith.

Supports 116,117 are threadedly engaged in generally U-shaped upper and lower block support plates 124,126 respectively. Plates 124,126 are in turn attached as by means of screws 127 to base members 128,130 respectively. Springs 132 bias blocks 106,108 toward and into engagement with the supports 116,117 associated therewith. See FIG. 7.

As will be understood, rotation of threaded members 120 of supports 116,117 displaces the block 106, 108 and array 40,41 associated therewith in a generally vertical direction to raise or lower the array relative to the optical path against the bias of spring 132. Rotation of the threaded member of support 116 or 117 only, or simultaneous rotation of the threaded members of both supports 116,117 in opposite directions, effects a rotation or turning movement of the array supporting blocks to adjust the angle of the array relative to the horizontal.

To provide for adjustment of arrays 40,41 in a direction parallel to the horizontal, an adjustable support 140,142 is threadedly disposed in the upstanding end of each plate 124,126 with contact pads 121' thereof projecting into engagement with the outer end of projections 113 of upper and lower blocks 106,108. Spring 143 (Seen in FIG. 7) biases blocks 106,108 axially into contact with the adjustable support 140,142 associated therewith.

Rotation of the threaded member 120' of support 140 or 142 displaces the block 106,108 associated therewith axially in a direction parallel to the horizontal against the bias of spring 143 to adjust the position of the array 40 or 41 relative to the optical path.

Each array support assembly 101 is attached to the scan carriage frame 52 opposite lens 55 by means of a pair of externally threaded screw members 152,154 and cooperating locking screws 160. Screw members 152 and 154 are threadedly engaged in internally threaded blocks 156,158 carried on carriage frame 52. The terminal ends 151 of screw members 152,154 facing the array support assemblies 101 are hollow and internally threaded at 159 for receipt of the externally threaded locking screws 160. Spacers 161 and spring washers 162 are provided on each blocking screw 160 to position the array support assemblies in predetermined lateral position relative to the locking screws. Holes 164,165 in base members 128,130 of array support assemblies 101 permit locking screws 160 to pass therethrough into threaded engagement with screw members 152,154.

A generally spherically shaped recess 170 is provided in the face of each base member 128,130 coaxial with hole 164. A vertical generally V-shaped recess 171 is provided in the face of each base member 128,130 opposite hole 165. The terminal end 151 of screw member 152 is rounded off for receipt in recess 170 of base member 128,130. Screw member 154 has a vertical semi-circular segment 174 rotatably disposed on the terminal end thereof for receipt in V-shaped recess 171 of block members 128,130.

Alignment of arrays 40,41 perpendicular to the optical path and focusing thereof is effected by selective rotation of screw members 152,154 following attachment of the array support assemblies 101 to the ends of screw members 152,154 and the carriage frame 52 by locking screws 160. Tightening of locking screws 160 draws the spherical end of screw member 152 in the spherical recess 170 and segment 174 on screw member 154 into V-shaped recess 171.

Simultaneous rotation of both screw members 152,154 in the same direction moves the array support assembly 101 toward or away from lens 55 to adjust the array focus. Rotation of screw member 152 only causes the array support assembly 101 to pivot or rotate about the cylindrical segment 174 on screw member 154 to adjust the angular disposition of the array support assembly 101 relative to the optical path. To shield arrays 40,41 from extraneous light, a flexible diaphragm 175 is disposed between lens 55 and the array support.

DOCUMENT HANDLER

Figure 8:
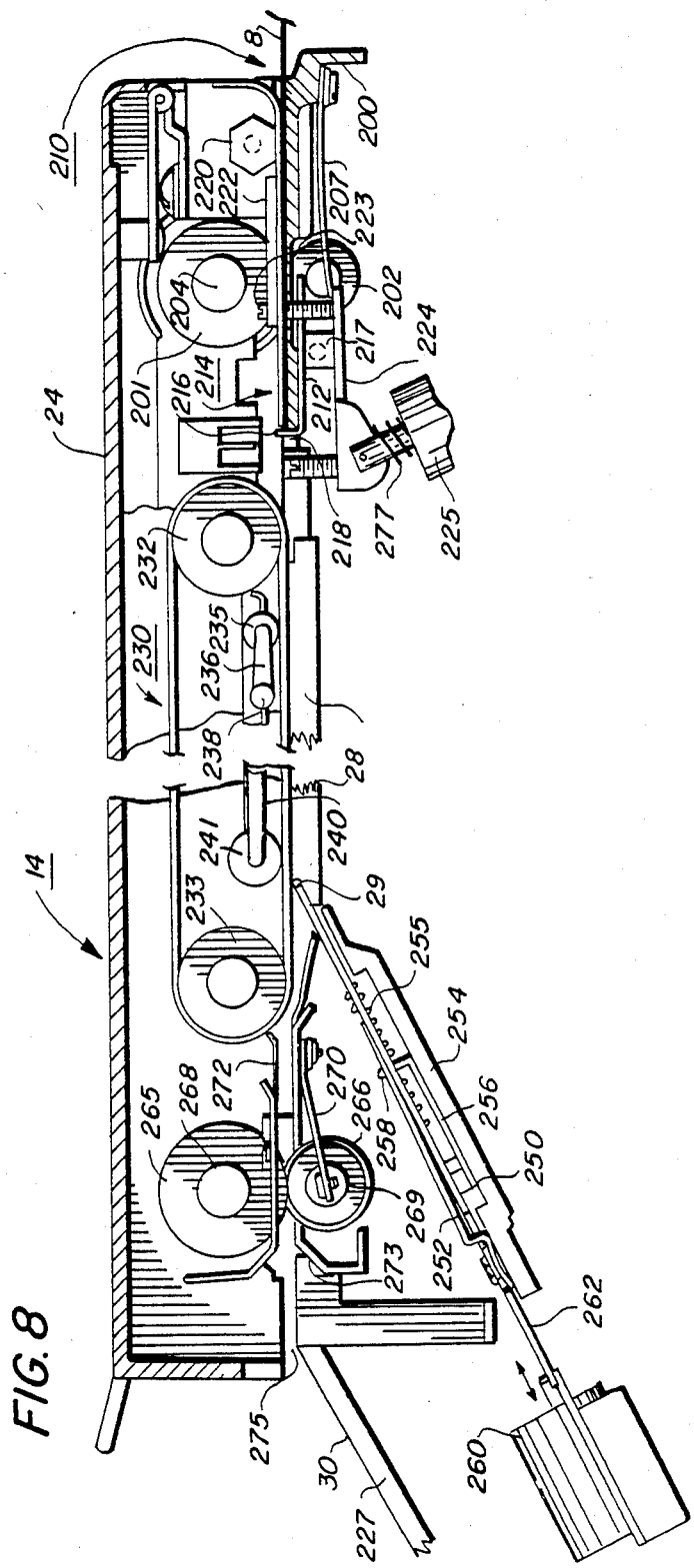
FIG. 8 is a side view in cross section of the IIT automatic document handler.
Figure 9:
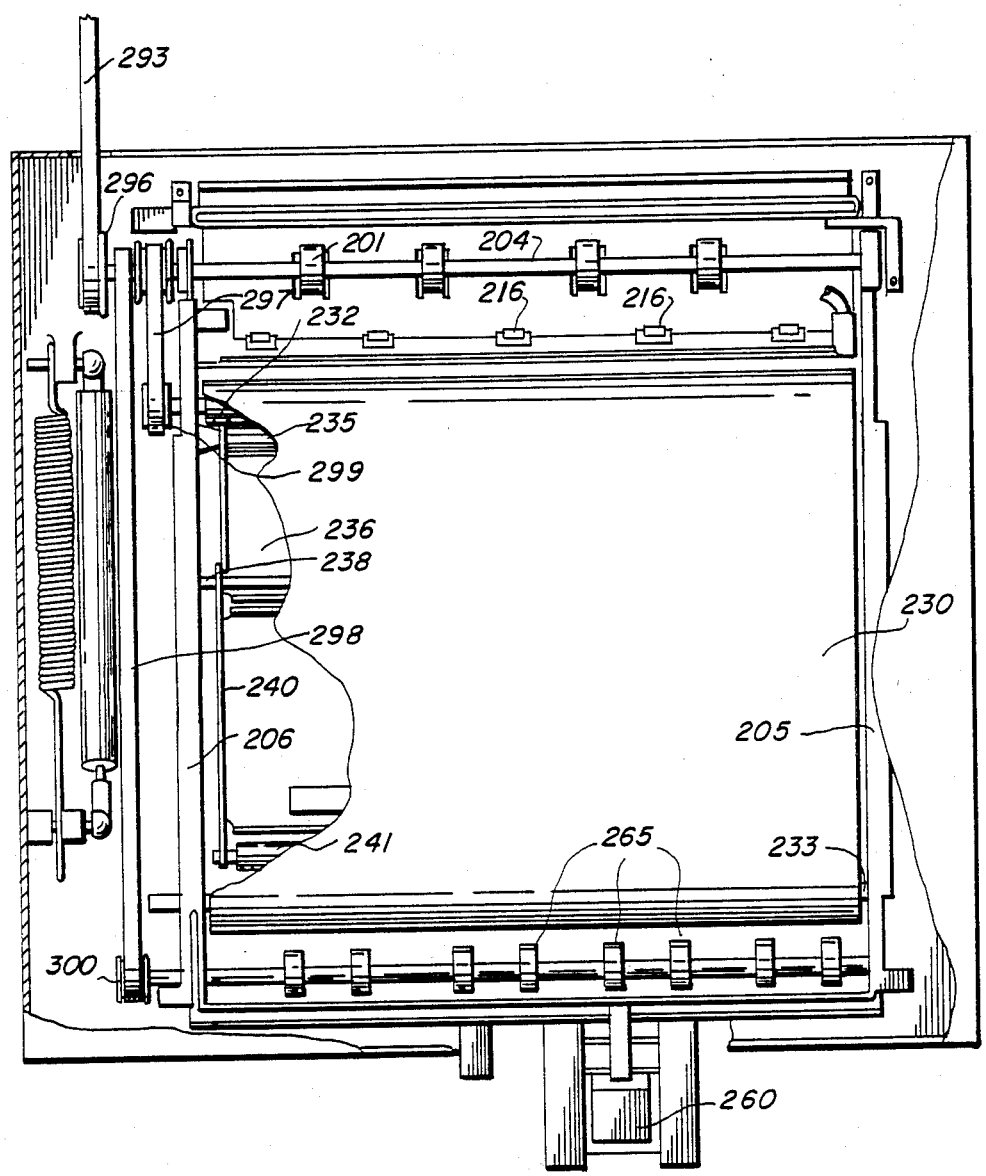
FIG. 9 is a top plane view of the document handler.
Figure 10:
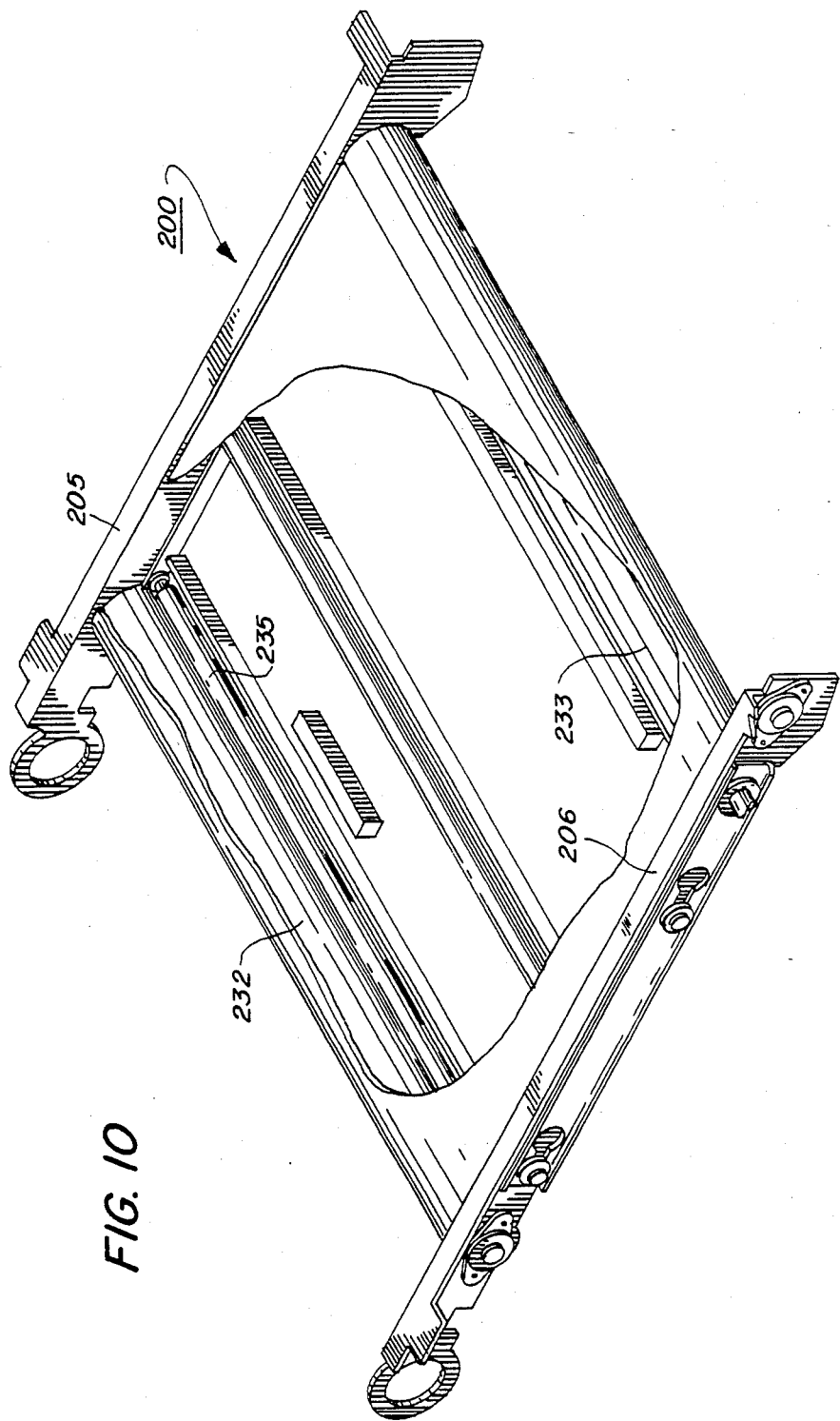
FIG. 10 is an isometric view showing the document handler frame.

Referring now to FIGS. 8-10, document handler 14 includes a generally rectangular frame member 200 on which cooperating document input pinch rolls 201,202 are rotatably supported. Upper pinch rolls 201 are carried on input roll drive shaft 204 journaled in sides 205,206 of frame member 200. The lower pinch rolls 202 are supported in cantilever fashion by spring members 207 secured to the rear wall of frame member 200. Pinch rolls 201,202, which are selectively disengageable so that a document 8 to be scanned may be readily placed between them, cooperate to advance the document inserted into document feed slot 210 in cover 24 forward to a wait station whereat the document is preregistered. For this purpose, a pivotally supported registration gate 212 with cooperating pivotally supported upper chute 214 is provided.

Gate 212, which includes plural spaced apart registration stop fingers 216, is supported on shaft 217 so that the fingers 216 project through openings 218 in frame member 200. Upper registration chute 214 is also arranged to be pivoted about a shaft 220 on frame member 200. When registration fingers 216 are in their operative or raised position, chute 214 is lowered to limit the thickness of a document which can be inserted in document feed slot 210. Chute 214 is biased downwardly (in a counter-clockwise direction) about the pivot axis of shaft 220 by gravity.

Upper chute 214 includes arm 222 coupled via adjustable set screw 223 to actuating member 224. Solenoid 225 is driveably connected to actuating member 224.

In operation, where solenoid 225 is not actuated, spring 227 biases registration gate pivot shaft 217 so that gate 212 is raised to intercept the leading edge of the document inserted into the document feed slot 210. On a disposition of a document in document slot 210 and against the registration fingers 216, solenoid 225 is actuated to lower the registration fingers 216. At the same time input rolls 201, 202 close to advance the document sandwiched therebetween forward into the nip of document transport belt 230. It will be understood that actuating member 224 connected to the registration member pivot shaft 217 works through set screw 223 to pivot chute 214 upwardly to facilitate movement of the document therethrough.

Platen transport belt 230 is supported within the frame assembly 200. Frame assembly 200 is pivotally supported at one side of platen 28 by input pinch roll drive shaft 204.

The platen belt transport 230 is comprised of a single belt which is stretched about the input drive pulley 232 and the exit idler pulley 233. Both input and exit pulleys 232,233 are journaled for rotation in sides 205,206 of frame assembly 200. Internally of the belt 230 an input backup roll 235 is pivotally supported. Input backup roll 235 is rotatably arranged at one end of a frame member 236 which in turn is pivotally supported about shaft 238 secured between sides 205,206 of the frame assembly 200. A second pivotally supported frame member 240 is pivotally arranged at one end about shaft 238 and rotatably supports a registration backup roll 241 at its free end.

Backup rolls 235,241 are urged against the interior of belt 230 by the weight of the parts to obtain the requisite driving force between belt 230 and the document 8 being advanced.

Platen belt transport 230 advances the document 8 onto platen 28 and against platen registration edge 29 to register the document into position for scanning by scanner section 12. Referring particularly to FIG. 8, registration edge 29 comprises a plate-like member 250 which is comparatively thin and sufficiently flexible to conform to the beveled wall 30 adjoining the front edge of platen 28. Registration edge 29 is supported for movement in a plane parallel to beveled wall 30 to enable edge 29 to be retracted after the document has been registered. This permits the document to be removed from the platen 29 at the end of the copy cycle.

Springs 252 bias the registration member 250 against the platen edge. The registration member 250 is arranged for sliding movement on the registration gate frame 254. Tension springs 255 bias registration member 250 toward a retracted position against stop member 256, member 250 being slotted at 258 for receipt of stop members 256. Registration member 250 is raised to bring the registration edge 29 thereof into position to intercept the leading edge of the document by means of a solenoid 260 which is connected to member 250 by link 262.

When raised to the document intercept position, the register edge 29 engages belt 230 to raise the register backup roll 241 slightly off of the surface of platen 28 to create a registration pocket. This reduces the normal force of belt 230 against the document as the document is advanced toward register edge 29.

After the document has been registered, solenoid 260 is engaged and register edge 29 is withdrawn to the retracted position shown in FIG. 8. This permits register roll 241 to drop back into engagement with the document through the belt 230 to facilitate advance of the document from platen 28 by the belt transport 230. If a second document has been preregistered against fingers 216, the document is fed onto platen 28 simultaneously with the removal of the previous document from platen 28.

The document is advanced by transport belt 230 into the nip of output roll pair 265,266. Roll 265 is supported on rotatable output roll drive shaft 268. Lower rolls 266 are idler rolls and are supported on individual shafts 269. Spring 270 biases rolls 266 into engagement with the rolls 265. Guide chutes 272,273 serve to guide the document into the nip of rolls 265,266 and through discharge opening 275 to document tray 266.

Figure 11:
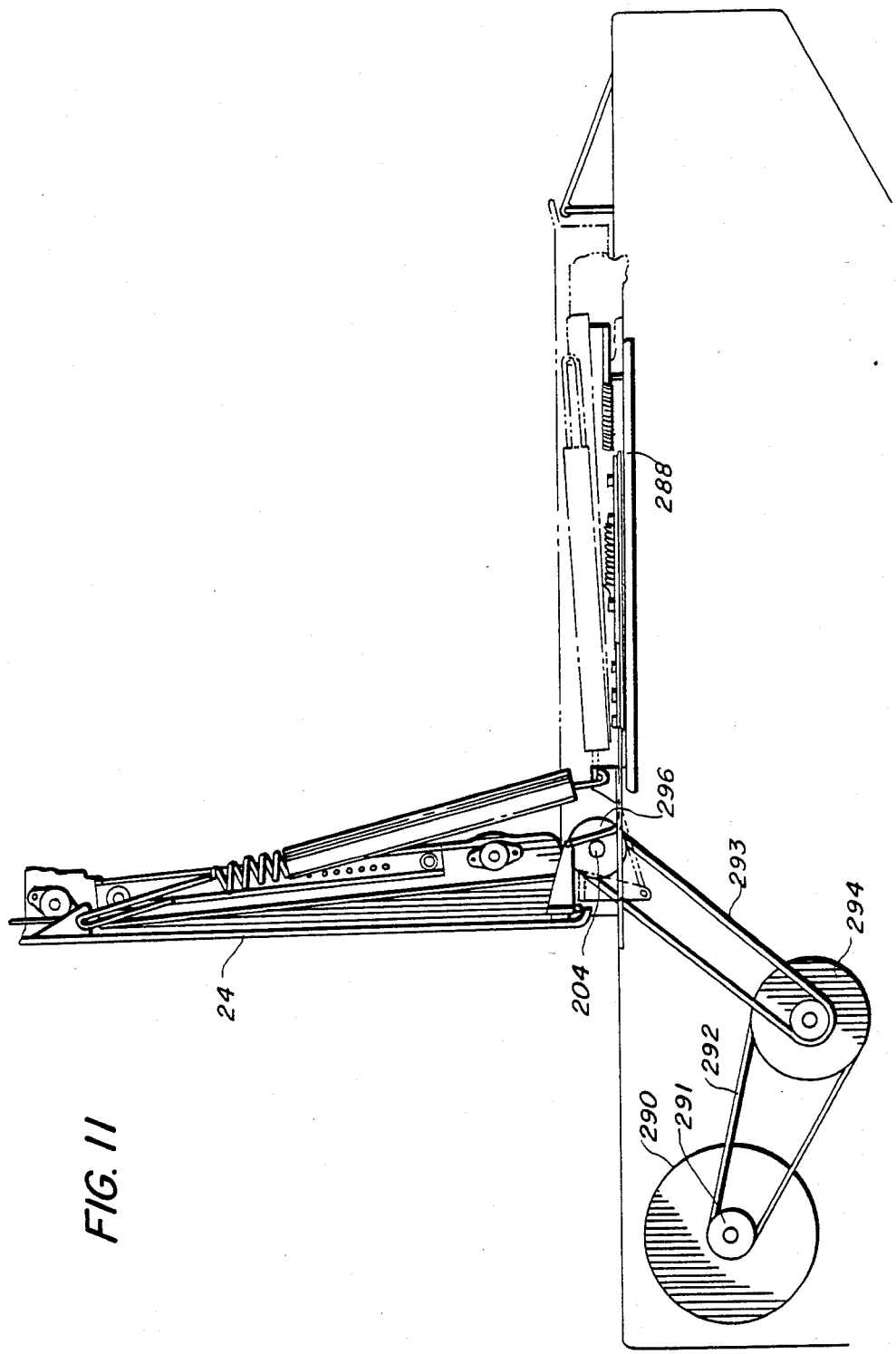
FIG. 11 is a side view showing the platen cover mounting structure and document handler drive train.
Figure 12:
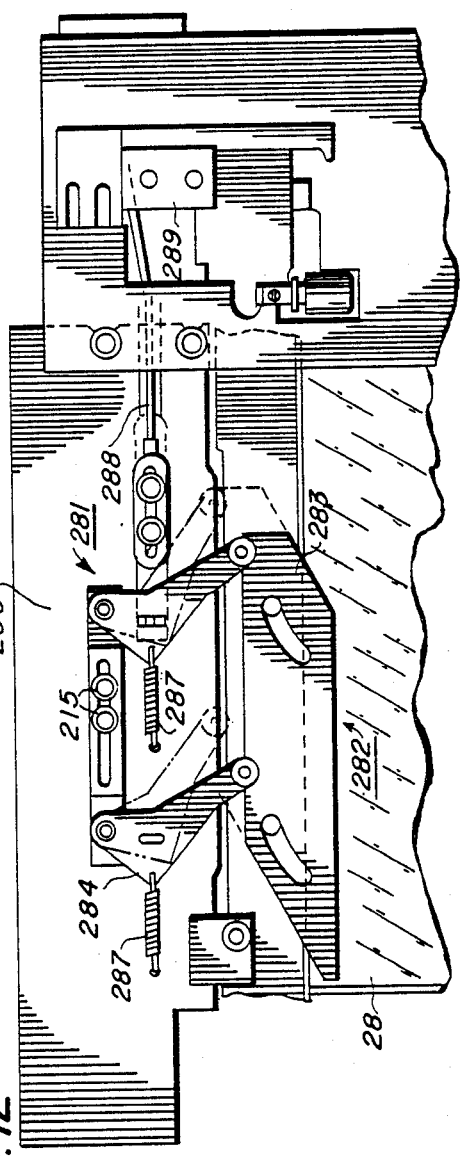
FIG. 12 is an enlarged view showing details of the platen cover mounting structure.

To permit document 8 to be located in registered position on platen 28 manually, a document register edge 282 is provided. Referring particularly to FIGS. 11, 12, parallelogram type linkage 284, secured to frame 200 provides parallel sliding movement of registration plate 283. Tension springs 287 bias the parallelogram linkage 284 such that the registration edge 282 thereof is in operative position on platen 28. Cable 288 couples linkage 284 to actuating member 289 mounted on the document handler cover 24.

When document handler 14 is raised, cable 288 is slack and manual registration edge 282, under the influence of springs 287, is operatively positioned on platen 28 to register a document placed thereon. When document handler 14 is closed, actuating member 289 pulls cable 288 taut to retract registration edge 282 to an out of the way position.

Referring particularly to FIGS. 9 and 11, a drive motor 290 is connected to document handler 14 via clutch and pulley 291, timing belts 292 and 293, and intermediate pulley pair 294 as shown in FIG. 11. Timing belt 293 is coupled to shaft 204 of roll 201 through pulley 296. Timing belts 297 and 298 couple shaft 204 to pulley 299 on platen transport belt drive roll 232 and pulley 300 of document discharge rolls 265.

Figure 13:
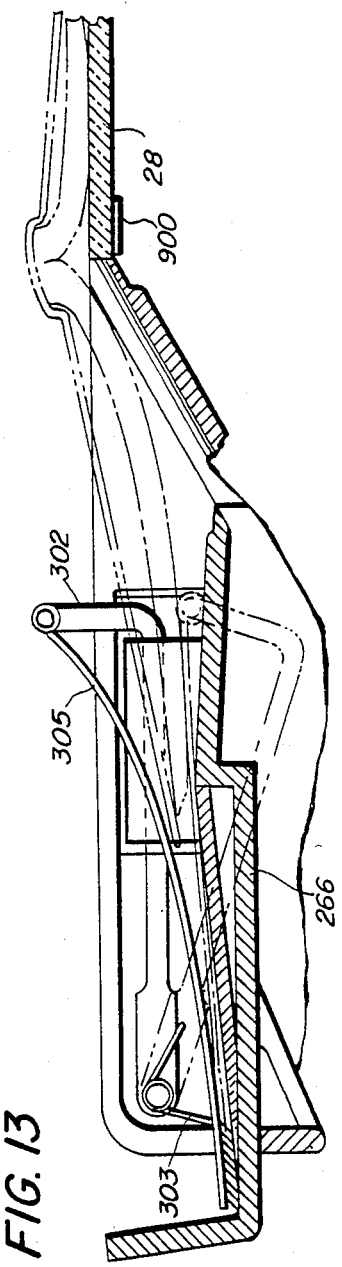
FIG. 13 is a side view showing the document handler catch tray.

Referring to FIG. 13, a pivotally supported document de-accelerator support bar 302 is provided in tray 266. Spring 303 biases bar 302 upwardly. Mylar strips 305 on bar 303 serve to de-accelerate documents exiting from document handler 14.

CONTROL SECTION

Figure 14:
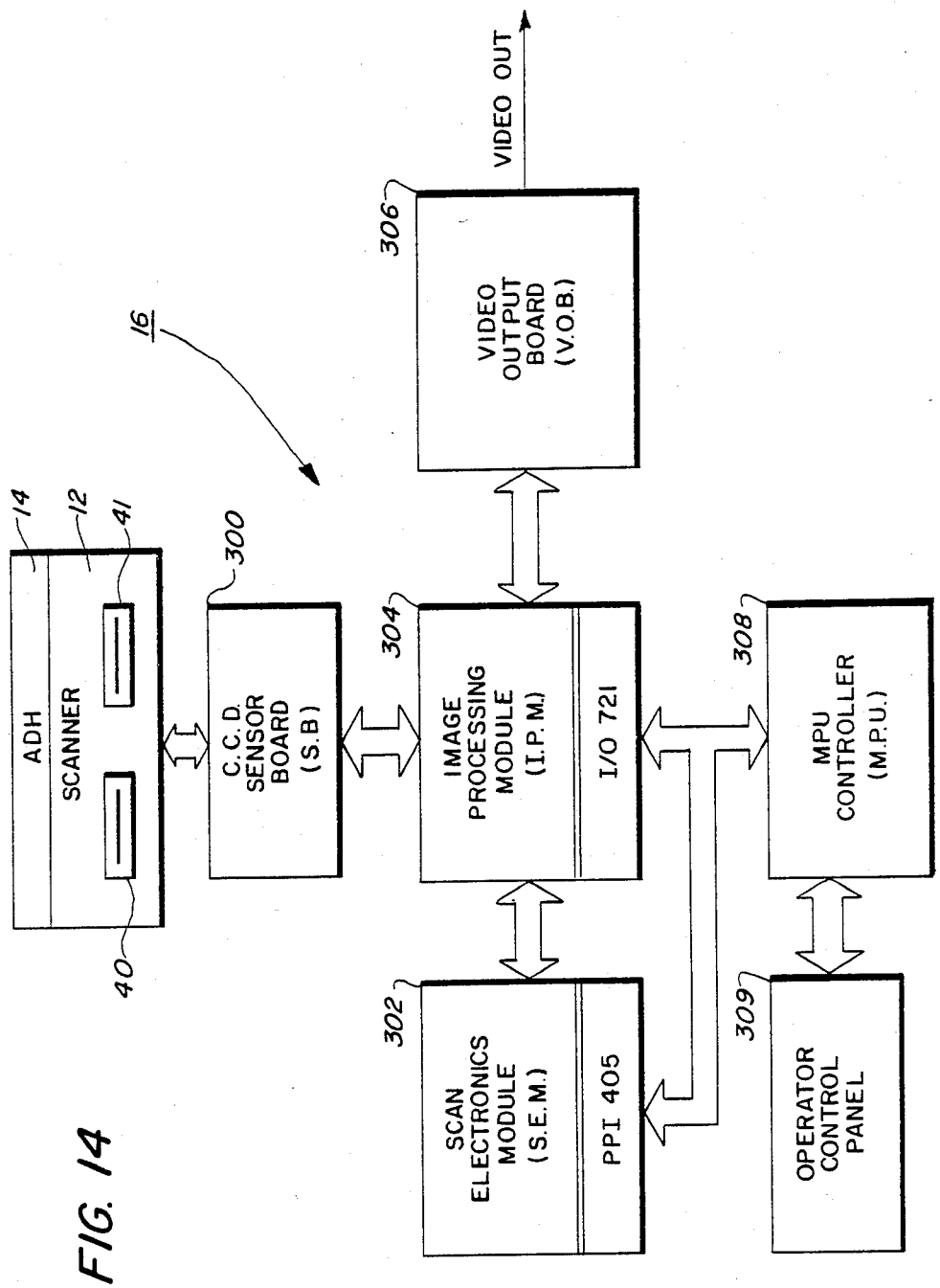
FIG. 14 is a schematic view illustrating the IIT control system.

Referring to FIG. 14, control section 16 may be conveniently divided into CCD sensor board (SB) 300, scan electronics module (SEM) 302, image processing module (IPM) 304, video output board (VOB) 306, MPU controller board (MPU) 308 and operator control panel 309. As will appear more fully herein video image signals or pixels produced by arrays 40,41 are initially processed on SB 300 following which the analog image signals are input to IPM 304 for further processing. Processing of the image signals is regulated by clock signals derived from SEM 302 and commands from MPU 308. MPU 308 in turn, responds to instructions by the user through control panel 309.

Following processing, the image signals, are output by IPM 304 to VOB 306. From VOB 306 the image signals may be further processed and/or stored in memory, transmitted, or input to a suitable copy producing apparatus, the latter to provide copies of the document or documents originally scanned.

OPERATIONAL MODES

IIT 10 is operable in one of several modes in accordance with the instructions of the user or operator. In addition, a DEFAULT MODE is automatically invoked whenever a system overload occurs, as for example, when compressing the image signals.

The operational modes of IIT 10 comprise a LINE INPUT MODE, PICTORIAL INPUT MODE, PICTORIAL ENHANCEMENT MODE, and DEFAULT MODE. The LINE INPUT MODE is used to scan documents which are comprised mainly of line type graphical information. In this mode, the analog image signals are compared with a preset threshold value to provide an image signal output by IIT 10 in binary (i.e. 1 bit per pixel) form. Scanning is effected at a relatively high speed and image output resolution after processing is relatively high. One scanning speed is 5 inches per second (ips) for both scan carriage 32 (Y-direction) and arrays 40,41 (X-direction). This results in an image resolution of 240 pixels per inch (in the X direction) by 480 lines per inch (in the Y direction). Interpolators 510, 512 and Sampler 590 (FIGS. 23, 24) cooperate to double the number of pixels (in the X-direction) to 480 pixels per inch as will appear. Scale coefficient latch 731 (FIG. 25) permits dropping of selected pixels to provide reduced size images as will appear.

The PICTORIAL INPUT MODE is used for scanning documents containing predominantly continuous tone pictorial information. In this mode, scanning is conducted at a relatively low speed. One suitable scanning speed is 2 ips for both scan carriage 32 and arrays 40,41. This results in image resolution during scanning of 240 pixels per inch (in the X direction) by 480 lines per inch (in the Y direction). As is the case of the LINE INPUT MODE, the image signals are interpolated to double the image resolution in the X direction. This results (in the example given) of an image output resolution of 480 pixels per inch (in the X direction) by 480 lines per inch (in the Y direction). In this mode of operation, the analog image signals are screened electronically to provide a binary (i.e. 1 bit per pixel) output.

The PICTORIAL ENHANCEMENT MODE is used for scanning documents containing predominantly half tone pictorial information or continuous tone pictorial information where it is desired to retain gray scale information for subsequent processing. In this mode, scanning is done at a relatively low speed in both X and Y directions with reduced image resolution. For example, in this mode scanning may be at a rate of 2 ips for scan carriage 32 and at the rate of 1 ips for arrays 40,41. This results in an image resolution of 240 pixels per inch (in the X direction) by 240 lines per inch (in the Y direction). The image output is quantized, coded 6 bit gray scale as will appear.

The DEFAULT MODE may occur when an overload is detected on the system. In response thereto, a rescan of the document is automatically requested with interpolation omitted. Rescanning is effected at a relatively high speed, for example at 5 ips with resolution of 240 pixels per inch (in the X direction) by 480 lines per inch (in the Y direction). The output is in 1 bit binary form from either thresholding or screening, depending on the operational mode selected.

ARRAYS

Figure 15:
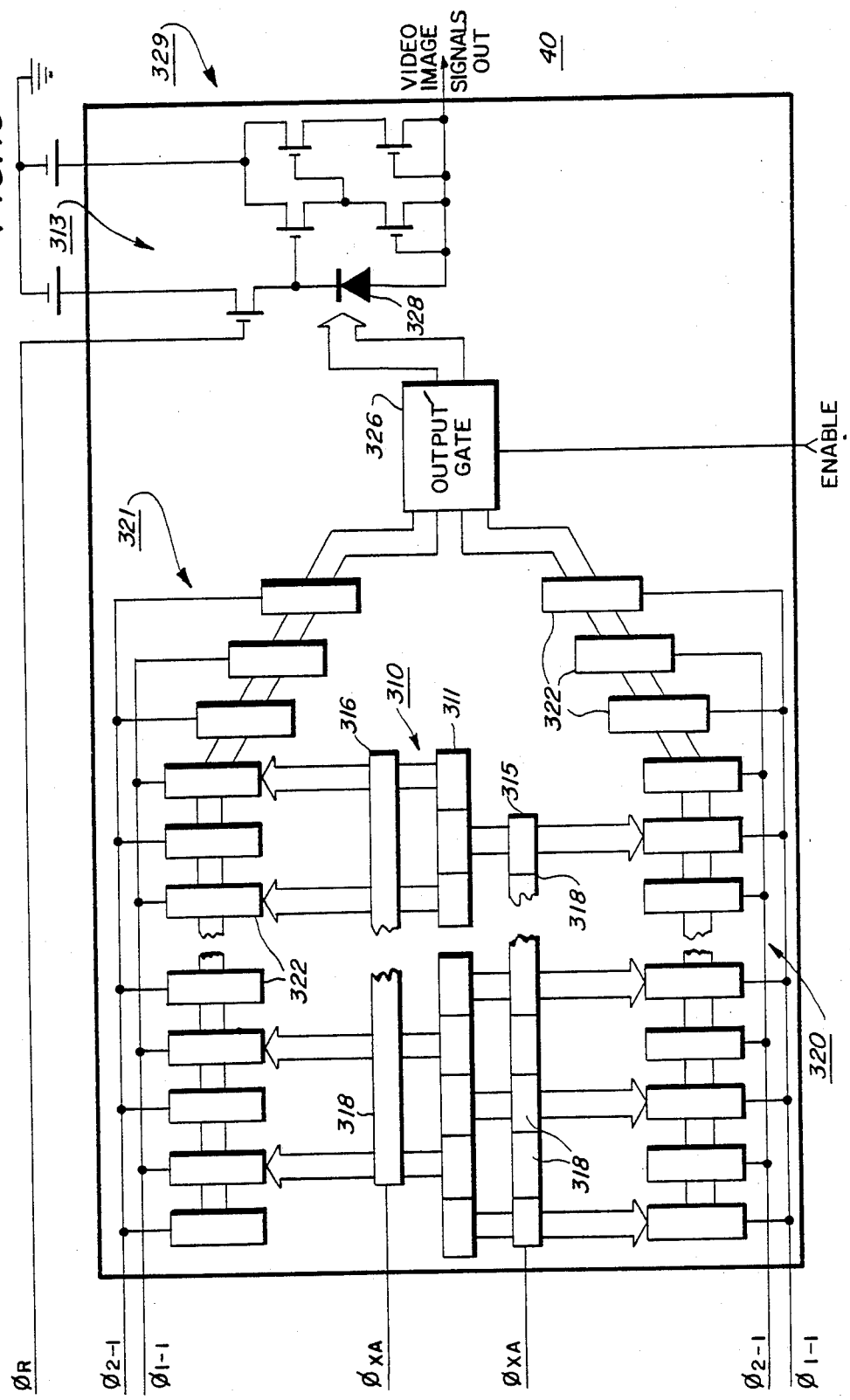
FIG. 15 is a schematic view illustrating internal construction of a scanning array.

Referring particularly to FIGS. 15 and 16, the exemplary CCD type arrays 40,41 each include a succession (i.e. array) of photosensitive elements 311 on the narrow center portion of silicon chip 313. Elements 311 are flanked on either side by rows 315,316 of transfer gates 318. Registers 320,321, which comprise parallel input-serial output analog registers, are disposed on either side of the rows 315,316 of transfer gates.

Transfer gates 318 switch the output of the individual photosensitive elements 311 to phase gates 322 of shift registers 320,321. The total number of transfer gates used in each row 315,316 is equal to one half the total number of photosensitive elements 311 with alternate, i.e. odd numbered photosensitive elements coupled through row 315 of transfer gates to shift register 320 and even numbered photosensitive elements coupled through row 316 of transfer gates to shift register 321.

The total number of phase gates 322 in shift registers 320, 321 is equal to the number of photosensitive elements 311 that comprise each array and as a result, only alternate shift register phase gates are coupled to the photosensitive elements 311. Arrays 40,41 function to convert the graphical image of a document 8 to a series of electronic image signals or pixels. On exposure of the photosensitive elements 311 to the illuminated document over a preset time interval (termed the "integration" period), a charge proportional to the luminous energy reflected from the document is generated. Following integration the charges on the photosensitive elements are transferred en masse to phase gates 322 of shift registers 320, 321 on enablement of transfer gates 315,316 by a transfer signal $\phi_{XA}$, $\phi_{XB}$.

Following transfer of the charges from the charge coupled cells to alternate gates of registers 320, 321, the resulting image signals are shifted by means of clock driving pulses $\phi 1$-1, $\phi 2$-1, $\phi 1$-2, $\phi 2$-2 (FIG. 16) serially along registers 320, 321 (i.e. from left to right in FIG. 15) to output gate 326. There image signals and offset signals from the matching phase gates of the adjoining registers are summed and output via holding diode 328 of amplifier section 329 to emitter followers 333 (FIG. 17) where initial signal processing commences.

SENSOR BOARD

Figure 16B:
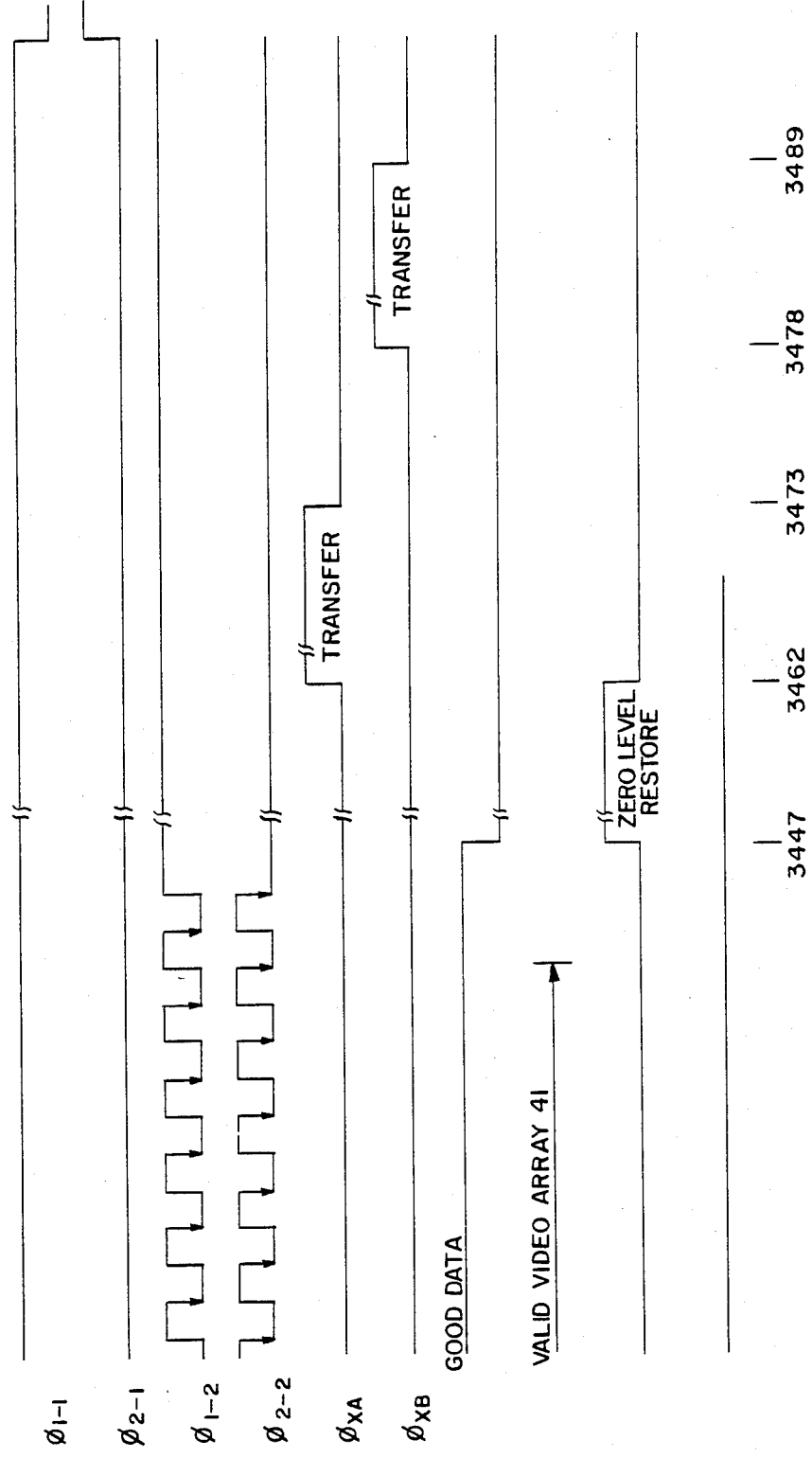
Figure 17A:
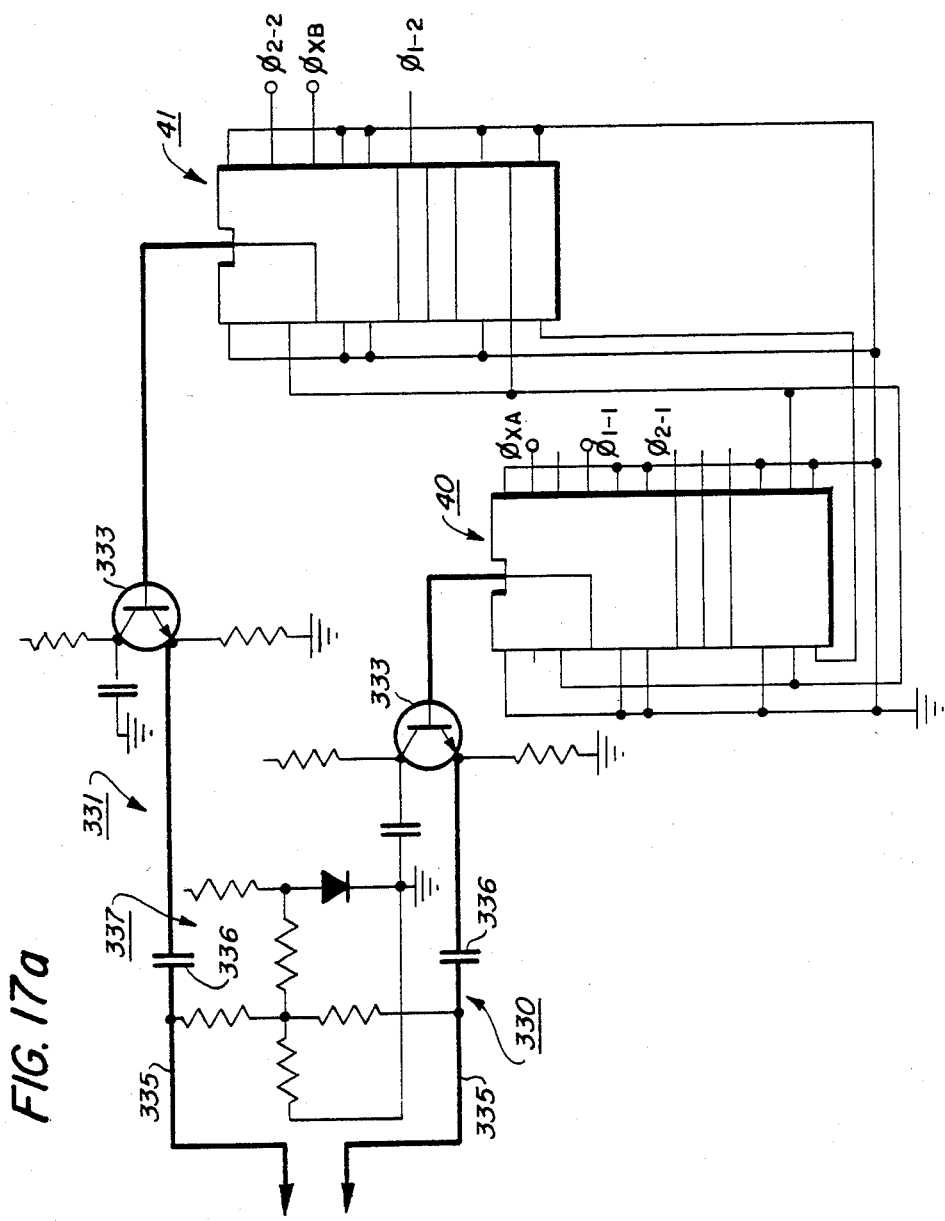
FIGS. 17a and 17b are circuit schematics of the sensor board video image signal processing circuitry.
Figure 17B:
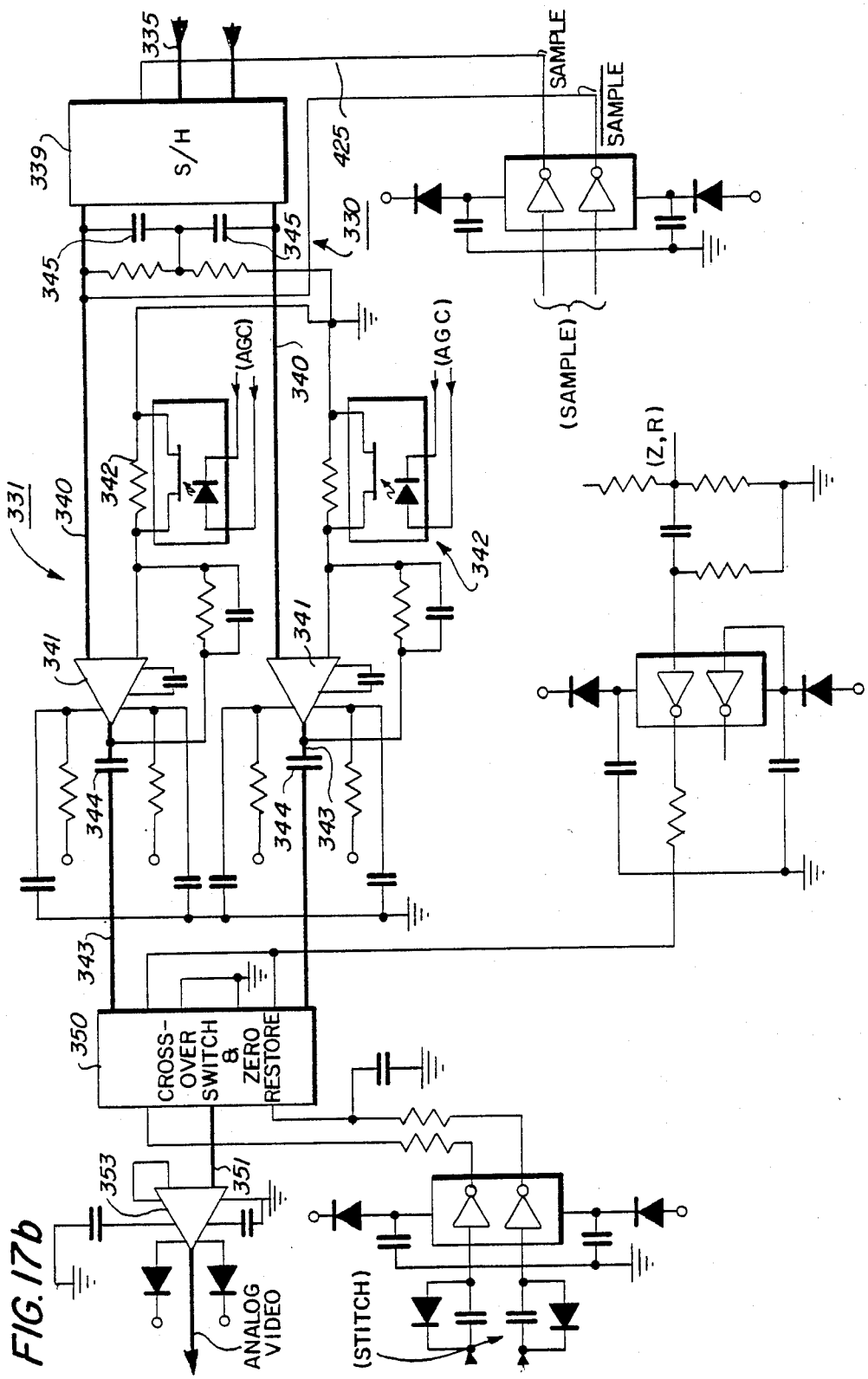

Referring particularly to FIGS. 16, 17, image signals produced by arrays 40,41 are output along separate signals channels 330, 331 of SB 300 before being combined at crossover switch 350 (FIG. 17b to provide an uninterrupted stream of video image signals (analog video) for each line scanned. During this stage certain initial signal processing occurs. Inasmuch as the component parts of each signal channel 330, 331 are the same, only channel 330 is described in detail herein.

Operating clock signals ($\phi_R$, $\phi 1$-1, $\phi 1$-2, $\phi 2$-1, $\phi 2$-2, $\phi_{XA}$, $\phi_{XB}$, GOOD DATA, SAMPLE, AGC, STITCH) are derived from SEM 302. Time 0 is arbitrarily chosen as a time a particular array starts to clock out video image signals. It should be understood, however, that certain other events, principally scanning or integration, and charge transfer (where the image signals are transferred from photosensitive elements 311 to shift registers 320,321), occur in the preceding cycle, i.e. from count 3462-3473 and count 3478-3489 (FIG. 16b).

As described earlier, the viewing fields of arrays 40,41 overlap one another to assure an uninterrupted stream of video image signals. On clocking out of the image signals from shift registers 320,321 crossover from one array (i.e. 40) to another (i.e. 41) is made at a preselected point within the overlapping viewing fields. The unused or excess image signals from both arrays 40,41 are discarded.

Figure 18A:
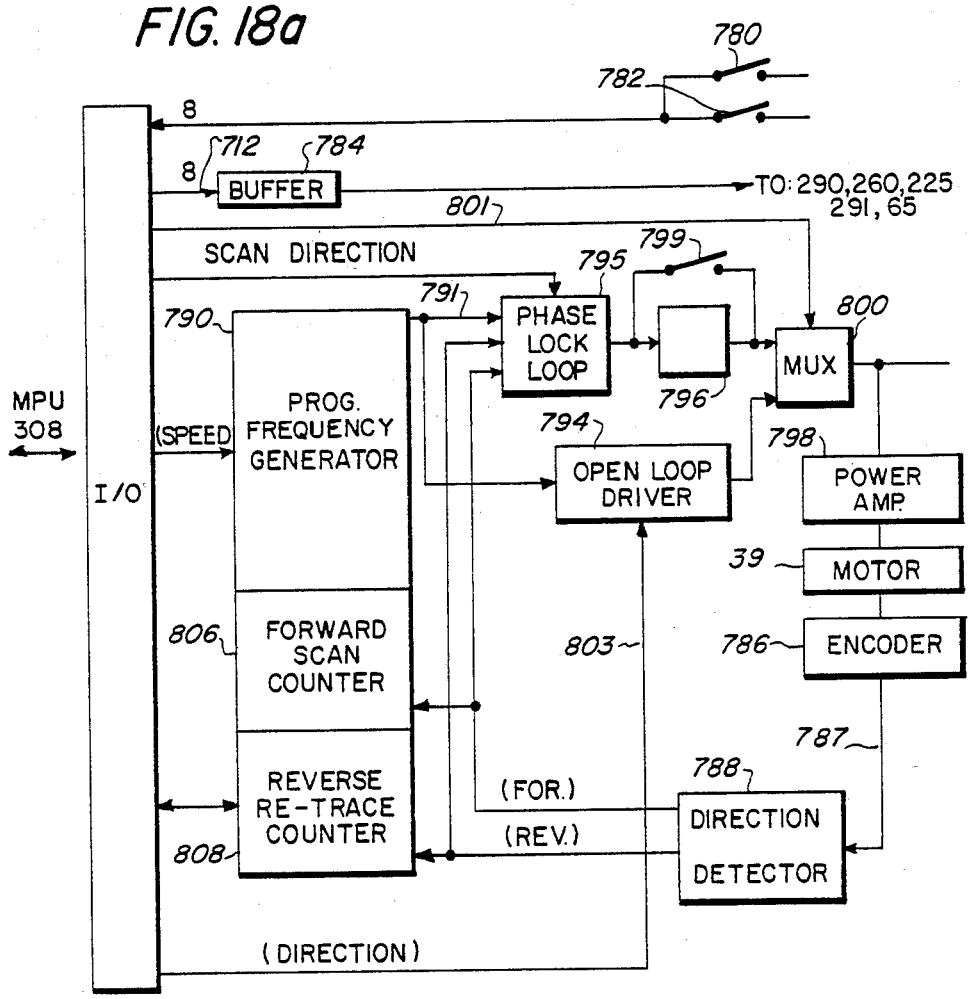
FIGS. 18a and 18b are schematic views of the scan electronics module timing and control logic.
Figure 18B:
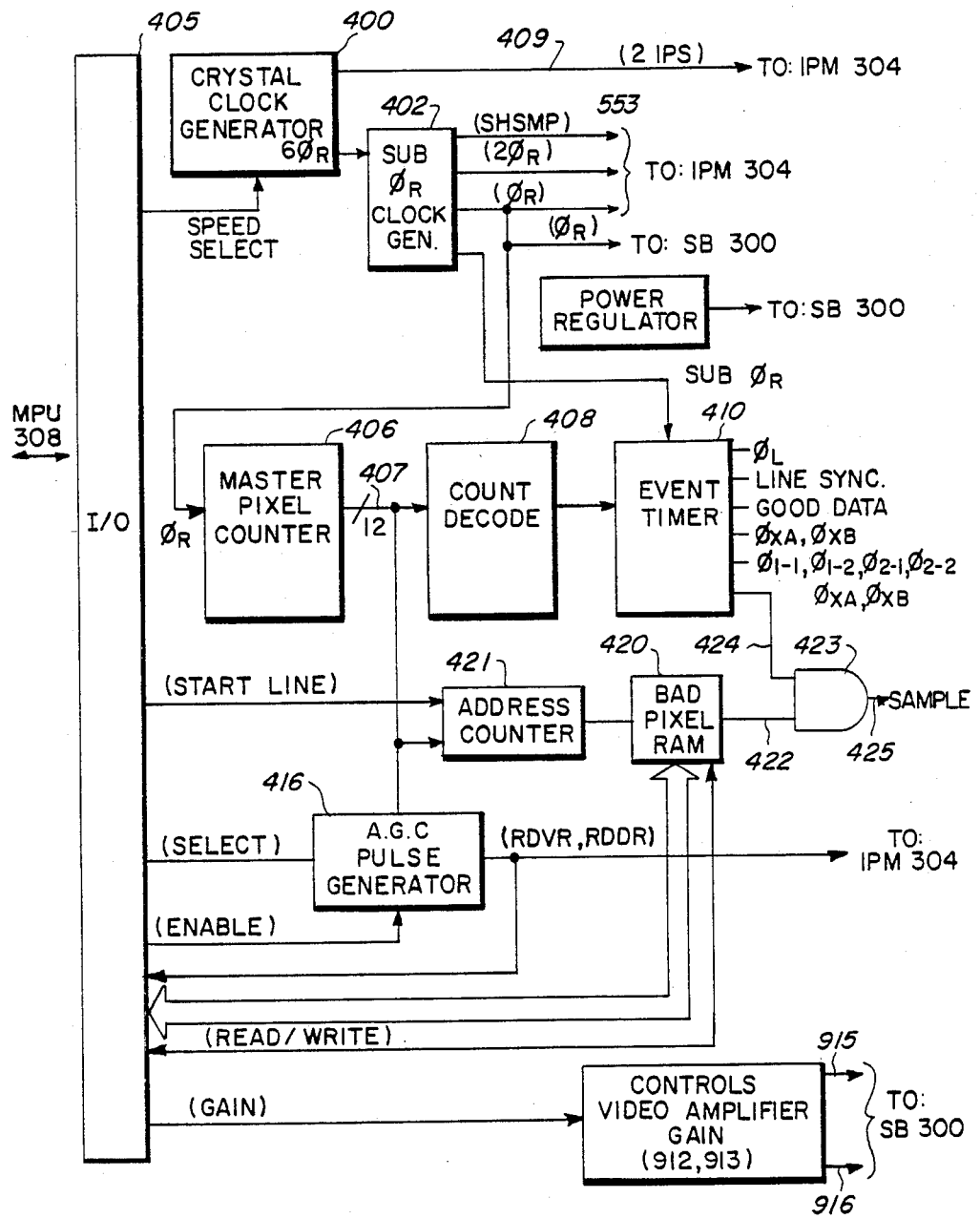
Figure 19:
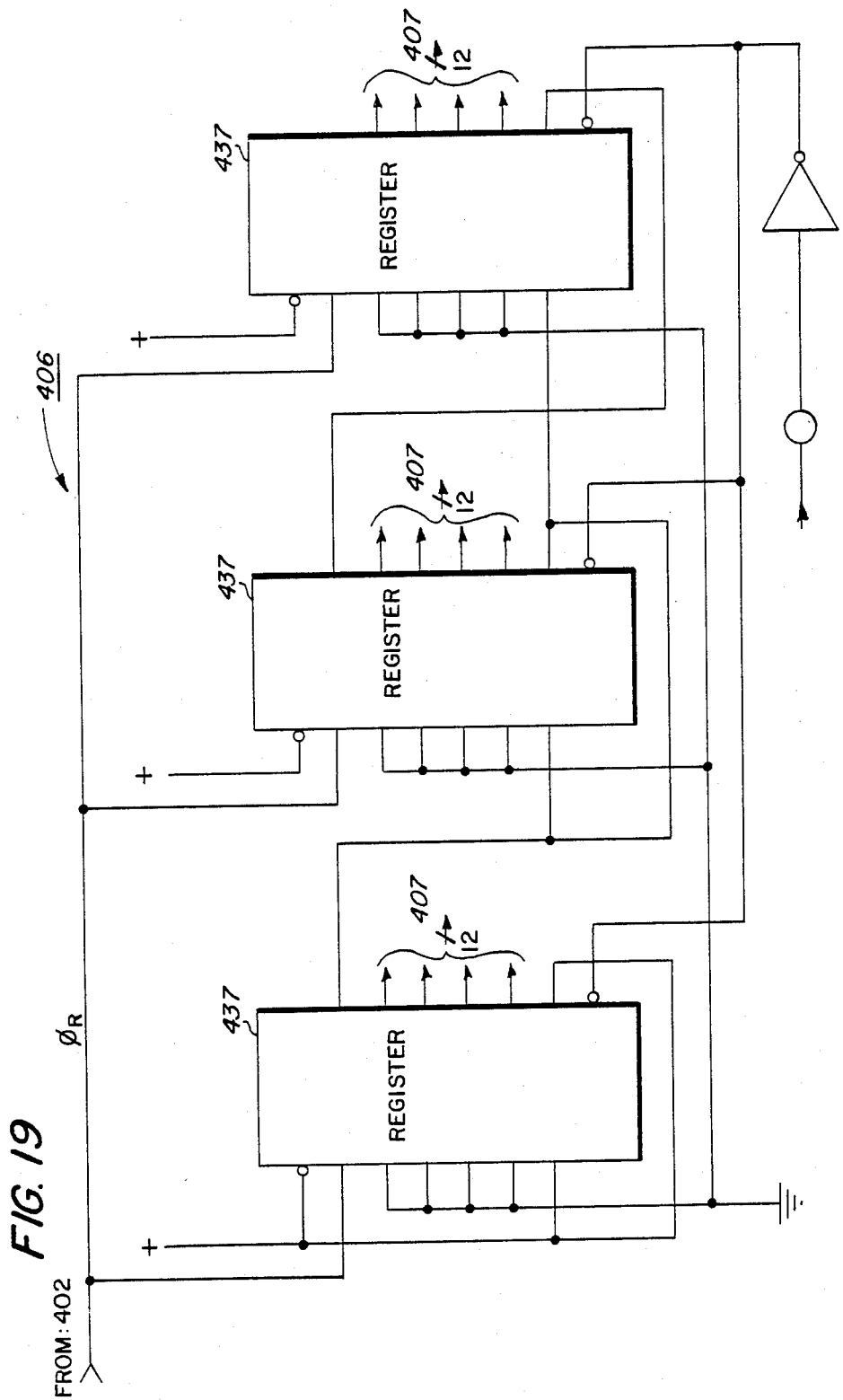
FIG. 19 is a schematic view of the master counter.

All events are clocked from a master counter 406 (FIGS. 18, 19). With counter at zero, image signals in shift registers 320,321 of array 40 are clocked out by clock pulses $\phi 1$-1, $\phi 2$-1 until a count of 1732 is reached. Clock pulses $\phi 1$-2, $\phi 2$-2 start at count 1716. At count 1724 the stitch signal (STITCH) goes low to trigger crossover switch 350 and couple array 41 to output lead 351.

With the crossover point selected in the example at count 1724, array 40 has 8 unused pixels (1724–1732) and array 41 has 8 unused pixels (1716–1724). These unused pixels are discarded.

Referring particularly to FIGS. 17a and 17b, video image signals output by the arrays are fed to emitter follower 333 which provides current gain and serves as a low impedence driver for sample and hold circuit 339. Follower 333 may for example, comprise a Texas Instruments 3904 transistor. The signal output of follower 333 passes via lead 335 and blocking capacitor 336 to sample and hold circuit 339. Capacitor 336 serves to block out the relatively large DC offset of the arrays. A predetermined bias is provided by bias circuit 337.

Sample and hold circuit 339 may for example, comprise a Signetics SD 5000 circuit. Circuit 339 responds to a periodic signal (SAMPLE) to periodically sample and hold the video image signals for a preset time interval. The output of sample and hold circuit 339 is fed via lead 340 to the non-inverting input of differential amplifier 341 which may for example, comprise a National Semiconductor LH 0032 amplifier. Amplifier 341 serves to modify the video image signal level in response to a gain signal (AGC) determined in accordance with the operating characteristics of each array by automatic gain control circuit 342, as will appear.

The image signal output by amplifier 341 is passed via lead 343 and blocking capacitor 344 to crossover switch 350 which as described couples one or the other array 40 or 41 to output amplifier 353 in response to a stitching signal (STITCH).

To restore channel 331 to a zero signal level prior to the next integration, a zero level restore (ZR) signal is input to switch 350 following the last image signal. In the exemplary arrangement shown in FIG. 16, the ZR signal is input to switch 350 from count 3447 to 3462 to complete a circuit coupling crossover switch 350 to ground.

SCAN ELECTRONICS MODULE

Referring particularly to FIG. 18b, SEM 302 provides clock and timing signals for operating the various components of IIT 10. SEM 302 includes a clock pulse generator 400 which may for example, utilize a pair of crystals (50.31 MHZ and 20.13 MHZ) and a flip flop divider (not shown) for generating base multiple frequency clock pulses corresponding to different IIT scanning rates. As will appear, IIT 10 may be operated at one of several scanning rates which, in the example described, comprise rates of 1 ips, 2 ips, and 5 ips. Selection of the IIT operating mode by the user or operator through control panel 309 determines the scanning rate. A control signal (SPEED SELECT) corresponding to the scanning mode selected is input by MPU 308 to clock generator 400 of SEM 302 to select the output clock signal frequency of clock generator 400. SEM 302 is coupled to MPU 308 through programmable peripheral interfaces (PPI) 405, which may for example, comprise Intel Model 8255A-5SR-PPI's.

The signal output ($6\phi_R$) of clock pulse generator 400 is input to subclock generator 402. Subclock generator 402, which may comprise suitable flip flop based logic circuitry (not shown) divides the clock signals ($6\phi$) input by clock pulse generator 400 into operating clock signals $\phi R$, $2\phi R$, SHSMP (SAMPLE COMMAND) respectively. Clock signals $\phi R$, $2\phi R$, and SAMPLE COMMAND are input to IPM 304 and clock signal $\phi R$ which is the reset signal corresponding to the pixel rate for arrays 40,41, is further input to master counter 406 of SB 300 (FIG. 19).

As described earlier, master counter 406 controls operational timing of arrays 40,41. Referring particularly to FIG. 19, master counter 406 includes plural registers 437 responsive to clock signals $\phi R$ from subclock generator 402 to provide a 12 bit clock signal output to bus 407 and count decode logic 408. Bus 407 is also coupled to programmable pulse generator 416 and address circuit 421 of bad pixel RAM 420.

Count decode logic 408 incorporates plural (i.e. 4) 6 bit to 8 bit registers with attendant NOR gate array (not shown) for decoding the clock signal input thereto from master counter 406 to provide a plurality of timed controlled signals to event timer 410.

Event timer 410, which may comprise flip flop based logic (not shown) for subdividing the input pulses thereto, provides the enabling signal (GOOD DATA) and clock pulses $\phi XA$, $\phi XB$ to IPM 304 and clock pulses $\phi 1$-1, $\phi 2$-1, $\phi 1$-2, $\phi 2$-2, $\phi XA$, $\phi XB$ and sample signal (SAMPLE) to SB 302 as described heretofore in connection with FIG. 16.

The function and purpose of programmable pulse generator 416 and bad pixel RAM 420 will appear hereinbelow.

The pulse clock frequency corresponding to 2 IPS (20.13 MHZ) generated by clock pulse generator 400 is output via lead 409 to A/D converter 501 of IPM 304 as will appear.

IMAGE PROCESSING MODULE

Figure 20:
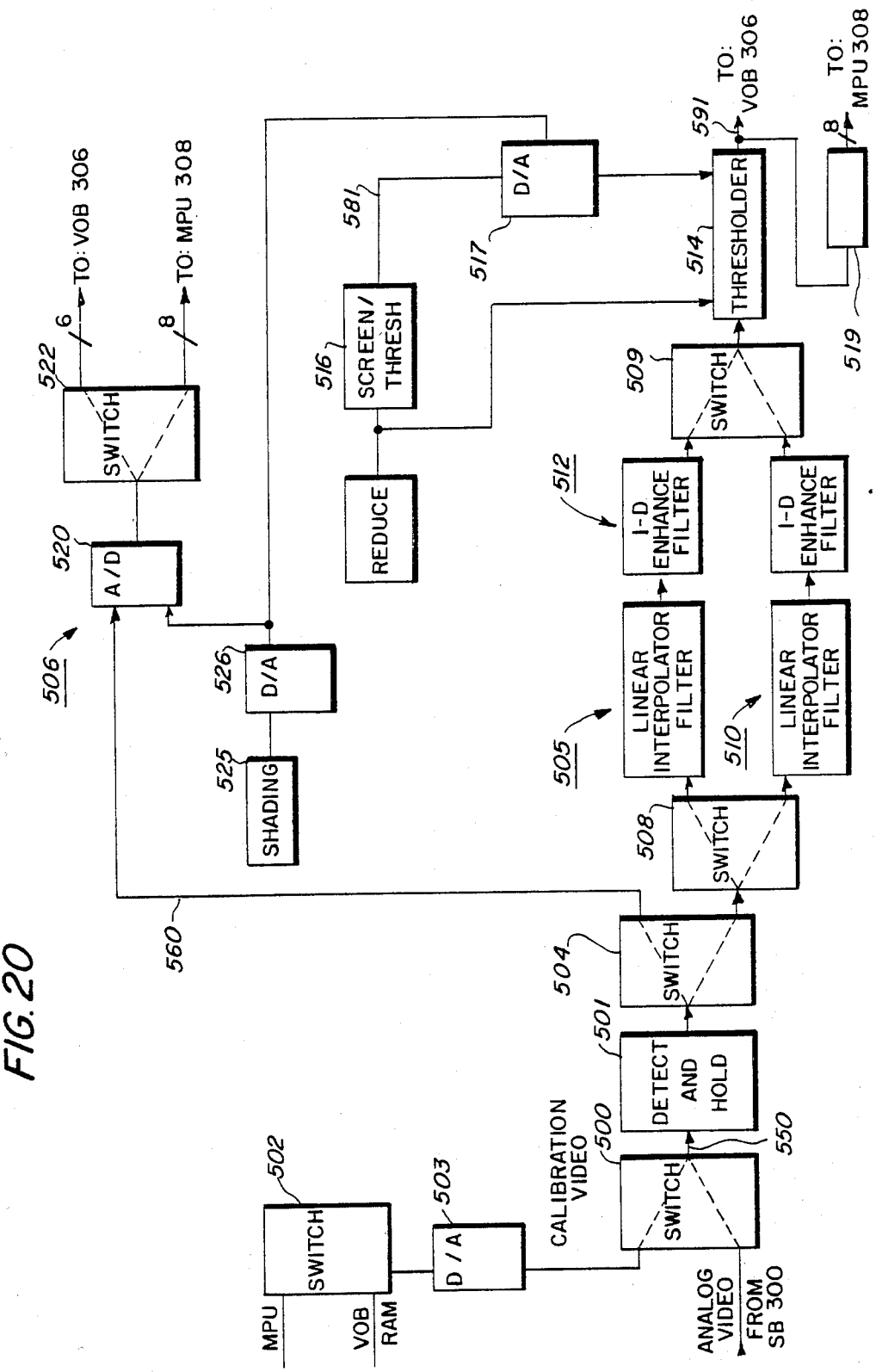
FIG. 20 is a schematic view showing the principal component parts of the Image Processing Module (IPM)

Video image signals (Analog Video) from SB 300 (see FIG. 17) are input to IPM 304 for further processing prior to output to VOB 306 and/or MPU 308. Referring particularly to FIG. 20, the flow of image signals through IPM 304 is there illustrated. A selector switch 500 permits the user to select the signal input source to be coupled to Sample and Hold (S/H) circuit 501 from either SB 300 or from IIT test-calibration selector switch 502. Image signals from S/H circuit 501 are input to either threshold-screen processing section 505 or A/D conversion section 506 depending on the setting of selector switch 504 by the operator. Where PICTORIAL ENHANCEMENT MODE is selected, switch 504 is set to route image signals to A/D conversion section 506. Where LINE INPUT MODE or PICTORIAL INPUT MODE are selected, switch 504 is set to route the image signals to threshold-screen processing section 505.

Threshold-screen processing section 505 has selector switches 508, 5099 for routing the image signals to either high speed (i.e. 5 ips) interpolator 510 (LINE INPUT MODE), or low speed (i.e. 2 ips) interpolator 512 (PICTORIAL INPUT MODE). The image signals from selector switch 509 are input to thresholder 514 where the signals may be either thresholded or screened, depending upon the output of screen-threshold circuit 516. D/A converter 517 converts the digital threshold-screen output of circuit 516 to analog signals for use by thresholder 514. The output of thresholder 514 which is in bit serial form, is routed either to VOB 306 or to serial-parallel converter 519. From converter 519, the signal output, in 8 bit form, is input to MPU 308.

Image signals routed to A/D processing section 506 are input to A/D converter 520 whereat the signals are converted from analog to 6 bit digital. The output of A/D converter 520 is fed to selector switch 522 which routes the signals to either VOB 304 or MPU 308.

To accommodate illumination vagaries and falloff of the exposure lamp, a shading compensation circuit 525 is provided. The output of circuit 525 is input via D/A converter 526 to both thresholder 514 and to A/D converter 520 for modifying the image data as will appear.

Figure 21:
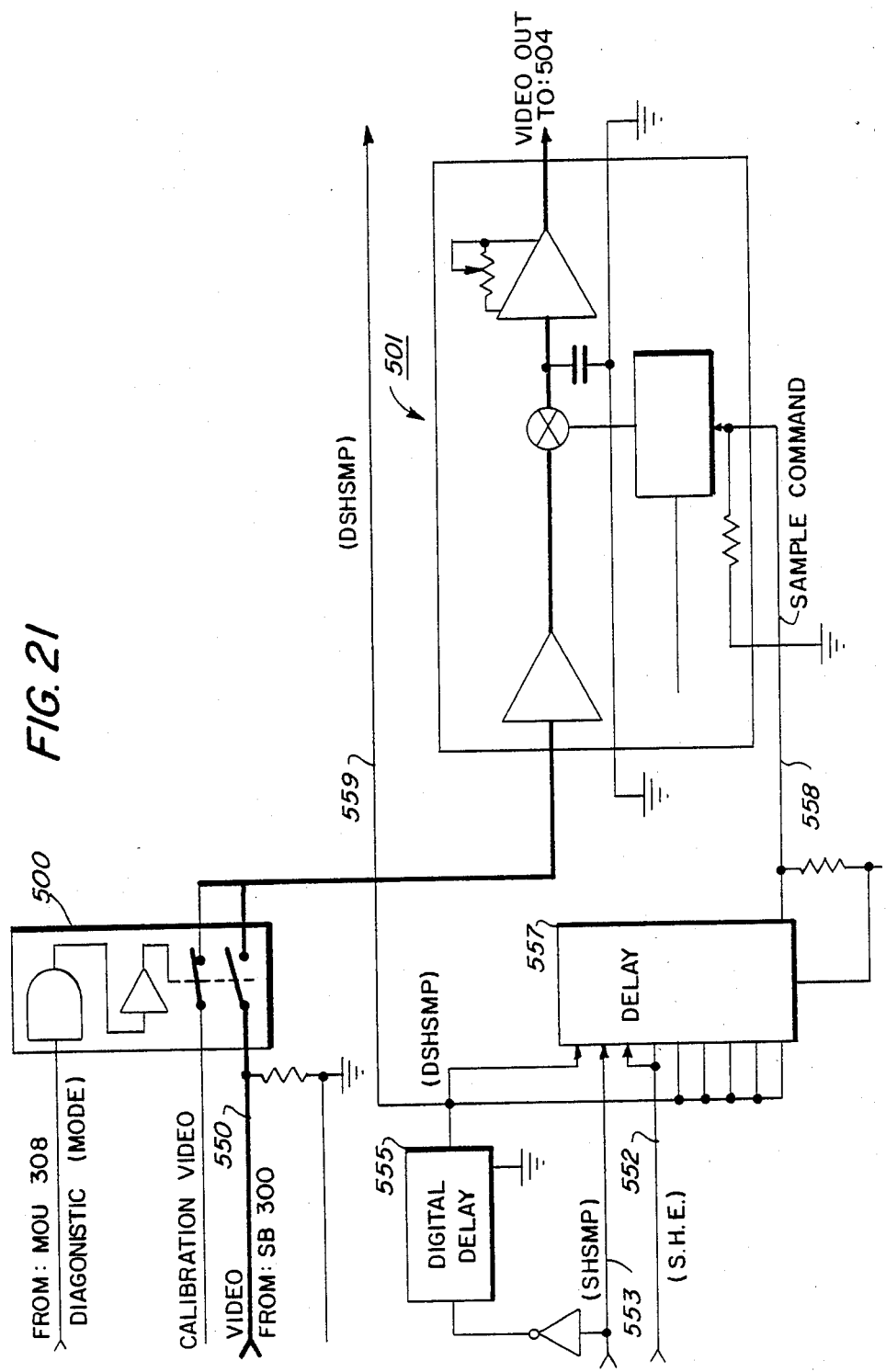
FIG. 21 is a schematic view of the IPM sample and hold circuitry.
Figure 22:
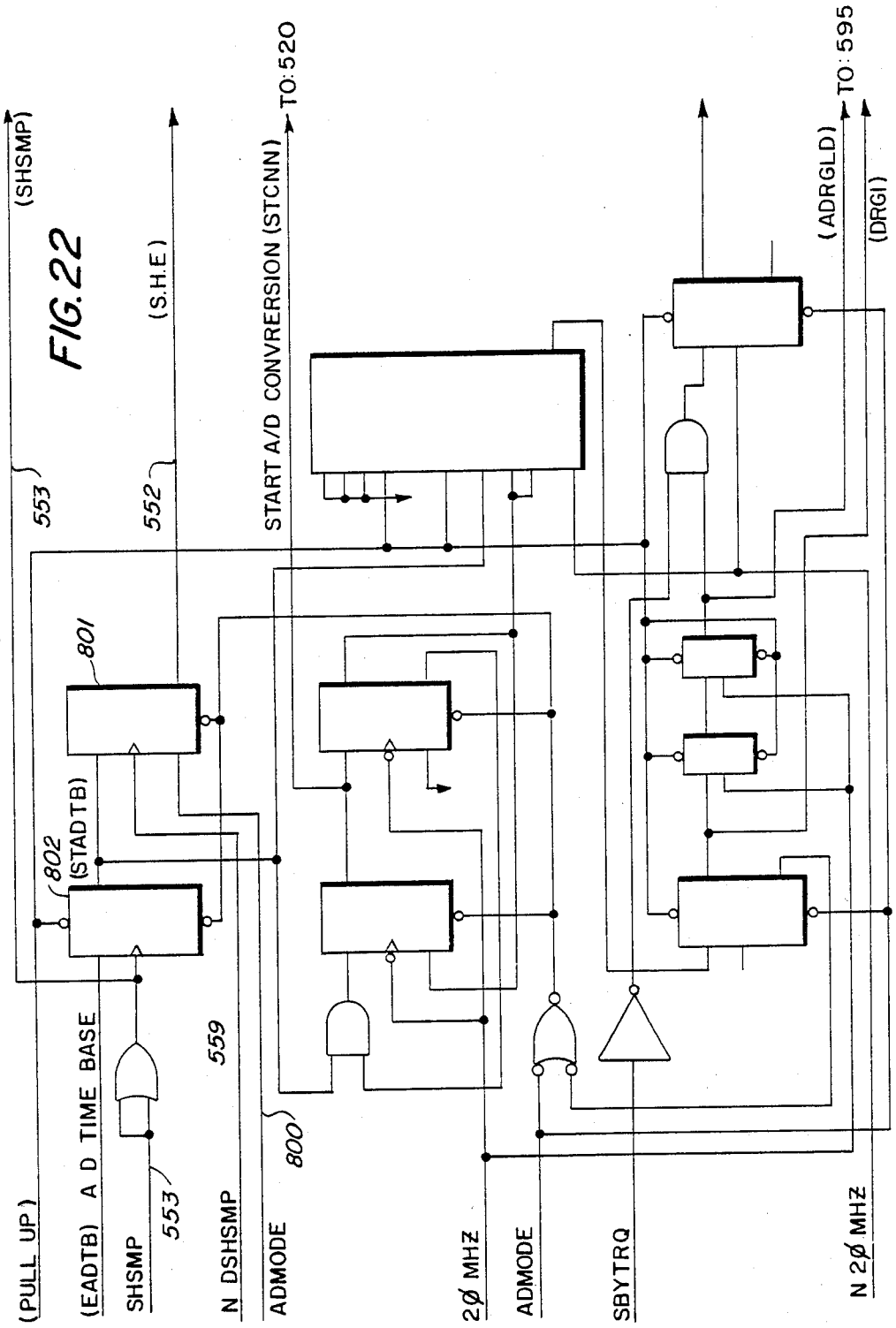
FIG. 22 is a schematic view of the control circuitry for the sample and hold circuit of FIG. 21.

Referring particularly to FIGS. 21 and 22, S/H circuit 501 serves as both a low pass filter to remove noise from the image signals and to periodically sample and hold the image signal level sampled over a preset time interval. S/H circuit 501 may for example, comprise a Datel SHM-UH sample and hold circuit.

Video image data from SB 300 is input to S/H circuit 501 in lead 550 via selector switch 500. Sample and hold enabling signal (SHE) in lead 552 inhibits a sample command (SHSMP) if the A/D conversion by A/D converter 520 is not completed when operating in the PICTORIAL ENHANCEMENT mode. Enabling signal SHE is derived from flip flop pair 801,802 (FIG. 22) in response to the signal EADTB representing the operational timing of A/D converter 520 in the context of sample command clock signals SHSMP and DHSMP. Selection of this mode by the operator generates an enabling signal (A/D MODE) in lead 800 to flip flop 801. The sample command (SHSMP) signal in lead 553 is derived from subclock generator 402 of SEM 302 (FIG. 18b) to operate flip flop pair 801,802 and activate S/H circuit 501 in timed synchronization with the input of video image signals such that each signal is sampled a predetermined distance between successive clock reset pulses. In the exemplary arrangement shown, samples are taken at 5/6 the distance between reset pulses. To correlate the sample command with the operating characteristics of S/H circuit 501, the sample command (SHSMP) signal is input to tapped digital delay 555 which for example, may comprise a Data Delay Model DDU-4. Digital delay 555 is set to delay the sample command signal for a preset interval to provide delayed sample command signal (DSHSMP). Both sample and delayed sample command signals (SHSMP, DSHSMP) are AND'd together in register 557 to provide a timed signal (SAMPLE COMMAND) to S/H circuit 501 through lead 558.

The sample command clock signals DSHSMP and SHSMP drive flip flops 801,802 to provide timed generation of sample and hold enabling signal (SHE).

Figure 23:
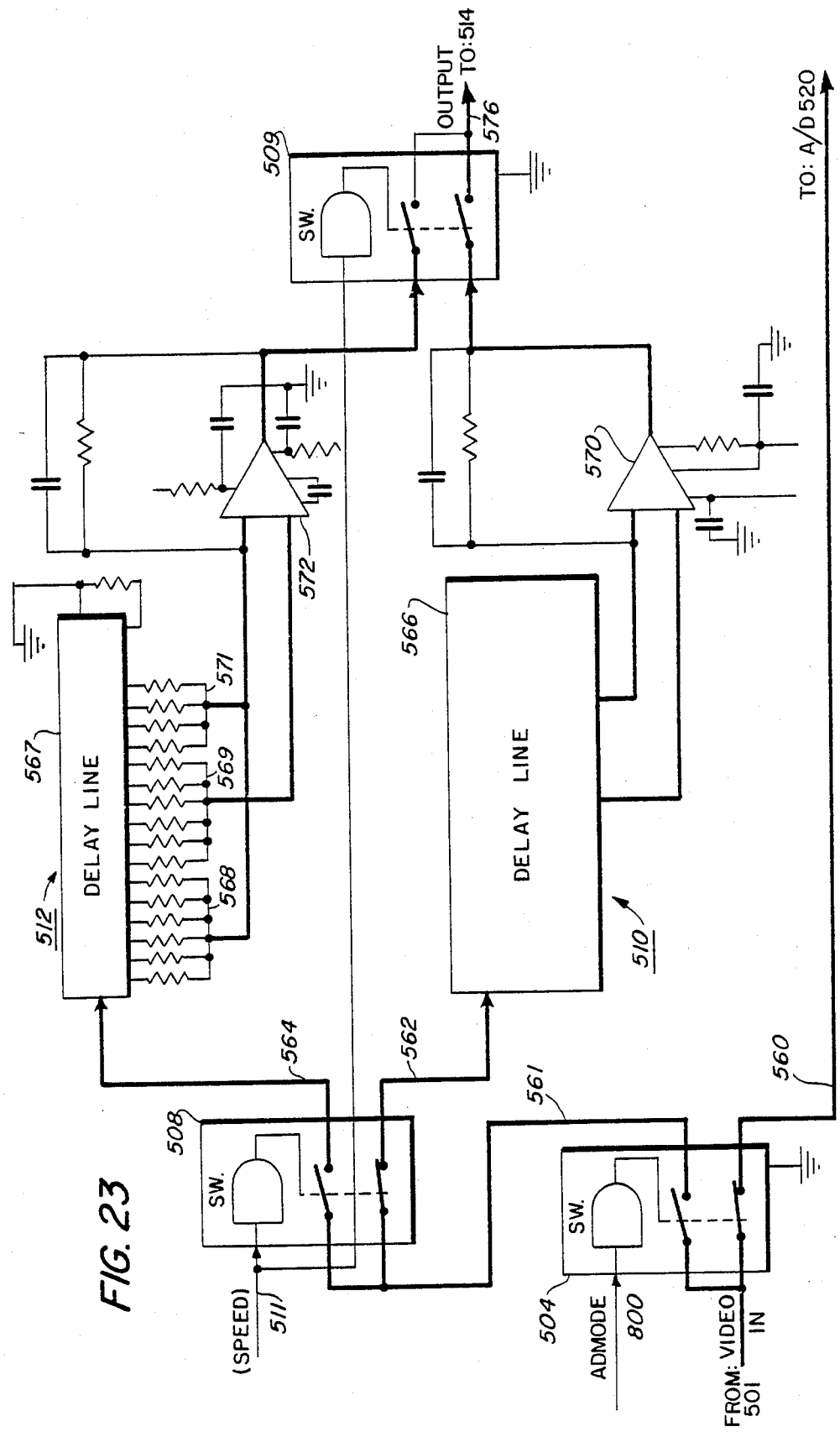
FIG. 23 is a schematic view of the IPM interpolation/filter structure.

Referring particularly to FIG. 23, the image signals output by S/H circuit 501 are routed by selector switch 504 to lead 560 and A/D converter 520 (FIG. 20) if PICTORIAL ENHANCEMENT MODE is selected or to lead 561 and selector switch 508 when either LINE INPUT MODE or PICTORIAL INPUT MODE is selected. Selector switch 508, in turn passes the signals to either lead 562 and high speed interpolator 510 (LINE INPUT MODE) or to lead 564 and low speed interpolator 512 (PICTORIAL INPUT MODE) in response to scan speed (SPEED) signal in lead 511. The scan speed signal it will be understood is dependent upon the operational MODE selected.

Interpolators 510,512 each comprise analog data delay lines 566,567. A linear interpolation filter is implemented by taking equally related subpixel taps 568, 569 over two adjacent pixels and summing the output to give a continuous analog signal which is later resampled by sampler 590 (FIG. 24) at a frequency double the pixel clock frequency to double the number of image signals (i.e. from 240 to 480 pixels per inch). An enhancement filter, which in the example shown is a 3 pixel enhancement filter is also included. The filter is implemented using delay lines 566,567 and differential amplifiers 570,572. Amplifiers 570,572 weigh the combined signals of taps 568, 571, representing the outside pixel sum, with the sum of the center pixel taps 569. The outputs of differential amplifiers 570, 572 are selectively coupled to thresholder 514 by selector switch 509 in response to the scan speed (SPEED) selected.

Data delay lines 566,567 which may for example, comprise Data Delay Devices No. 2214-4006 are identical except that delay line 567 for low speed interpolator 512 is longer than delay line 566 for high speed interpolator 519. Differential amplifiers 570, 572 may comprise RCA Model CA3100 OP AMPS.

Figure 24:
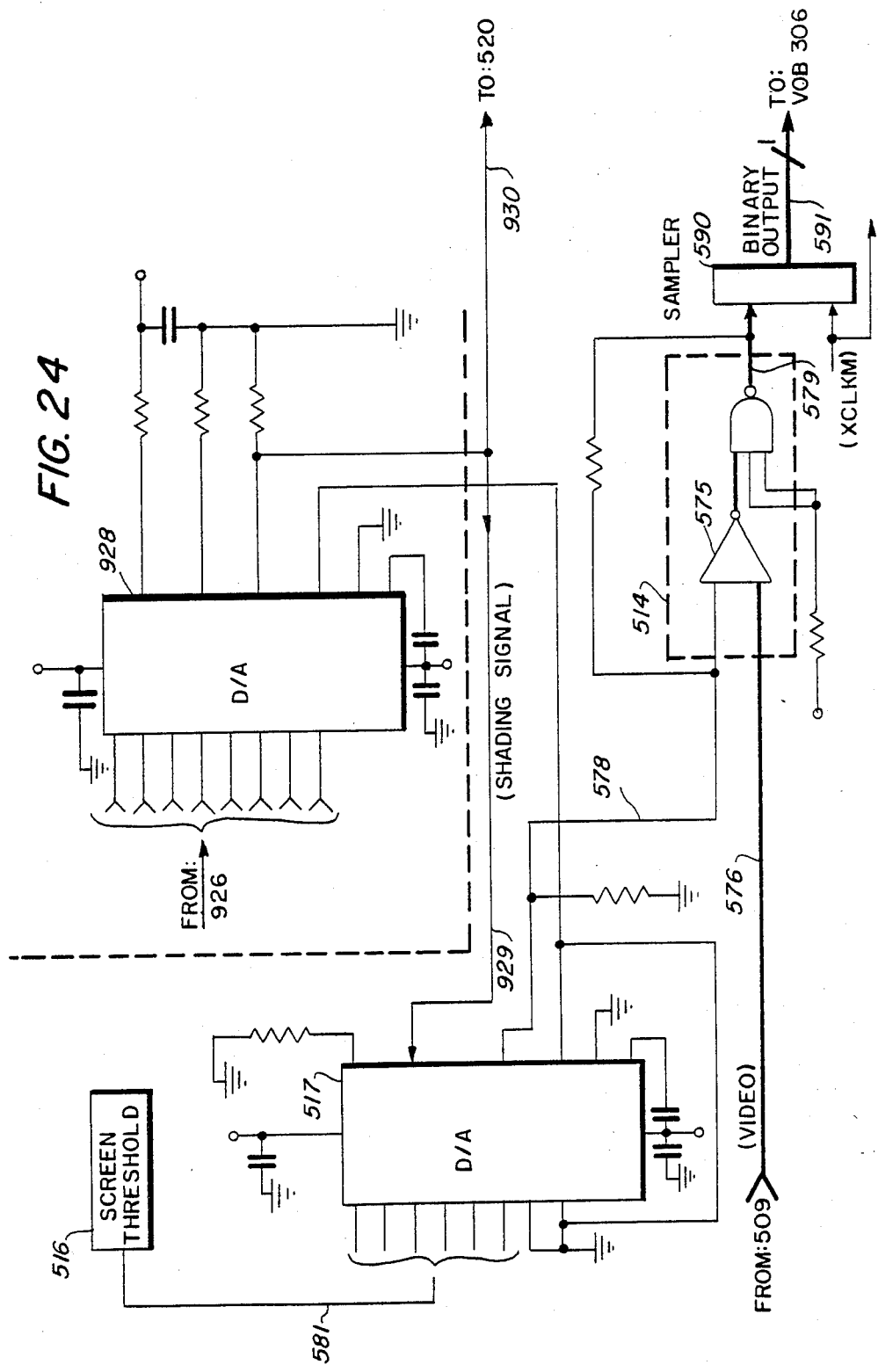
FIG. 24 is a schematic view of the IPM thresholder.

Referring particularly to FIG. 24, image signals output from processing section 505 are fed to analog signal comparator 575 of thresholder 514 via lead 576. Comparator 575 which may comprise a Signetics NE 521 analog signal comparator, compares the image signals on a pixel by pixel basis with threshold-screen signals provided in lead 578. Where the level of the image signal is above the level of the threshold-screen signal in lead 578, a binary signal output of 1, representing a black image area, is generated in output lead 579. Where the image signal level is equal to or below that of the signal in lead 578, a binary output signal of 0 representing a white image area is generated.

Figure 25A:
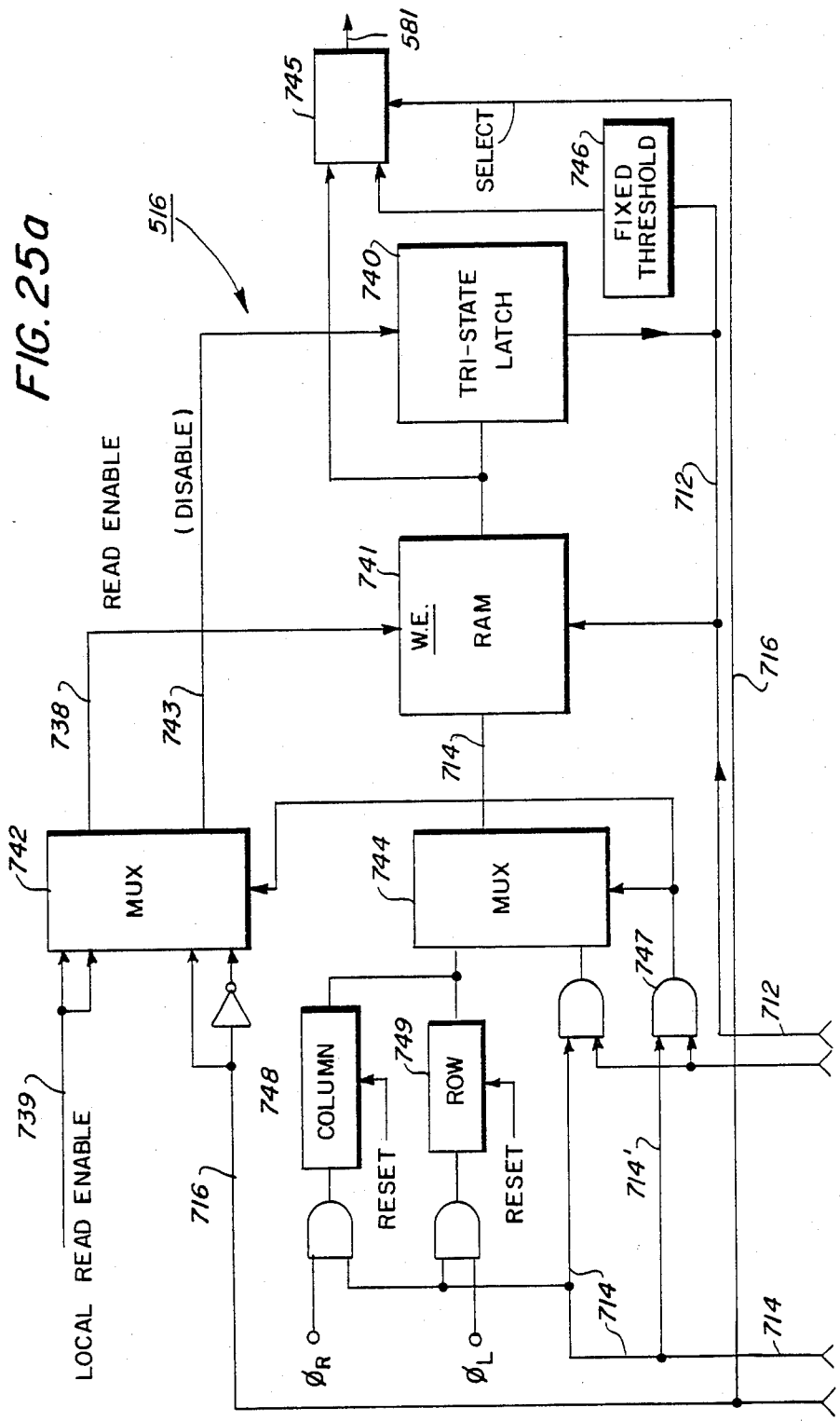

Threshold-screen signals in lead 578 are provided by D/A converter 517 in response to a 6 bit fixed threshold or screen pattern input thereto from screen/threshold circuit 516 through lead 581. Referring particularly to FIG. 25a, circuit 516 has screen values stored in RAM 741. The output of RAM 741 is coupled to control switch 745. Fixed threshold values are supplied by MPU 308 to threshold latch circuit 746. The output of latch 746 is coupled to control switch 745. A control signal (SELECT) from MPU 308 sets control switch 745 to output either screen values from RAM 741 or the fixed threshold value from threshold latch circuit 746 to lead 581 and D/A converter 517 in response to the operational mode selected, i.e. PICTORIAL or LINE INPUT MODE.

Bi-directional communication is provided between RAM 741 and MPU 308 through tri-state latch 740. During scanning, a local read enable signal is input to multiplexer 742 through lead 739. Multiplexer 742 applies a read/enable signal to the $\overline{WE}$ pin of RAM 741 and an output disable (DISABLE) signal to latch 740 through leads 738, 743 respectively. A second multiplexer 744 is addressed by column and row counters 748, 749 respectively driven by clock signals $\phi_R$, $\phi_L$ in synchronism with the pixel stream and scan line indexing respectively.

Scan line clock signals ($\phi L$, LINE SYNC) are derived asynchronously from the main clock decoding circuitry of SEM 302. Because of the relationship, velocity of scan carriage 32 must be kept accurate and stable.

Column counter 748 addresses columns 0–7 and then self resets to effect reading of the thresholds along one scan line in blocks of 8 pixels at a time. Row counter 749 addresses the matrix rows comprising each scan line, i.e. during the first scan line the first row is addressed, during the second scan line, the second row, etc. Counter 749 repeats after each block of 8 scan lines.

Where a fixed threshold is called for (LINE INPUT MODE), the threshold is loaded by MPU 308 and latched. Control switch 745 is triggered to input the fixed threshold value output by latch circuit 746 to output lead 581. Counters 748,749 are reset to zero count and inhibited.

In the MPU access mode, as for example, where new screen threshold values are to be written into RAM 741, MPU 308 sends a logic high signal through address line 714' and gate 747 to multiplexers 742,744. The signal input switches multiplexers 742,744 to select MPU control bus 716 and MPU address bus 714 instead of the local read enable signal in lead 739 and column/row counters 748,749. MPU 308 thereafter applies through control bus 716 a logic high or logic low signal to multiplexer 742 to signal via $\overline{WE}$ line 738 for MPU read or write respectively in RAM 741.

The binary image signals output by comparator 575 to lead 579 are fed to sampler 590 which may comprise a flip flop where the signals are sampled at a selected clock rate (XCLKM) to multiply the number of image signals. A stream of binary image signals from sampler 590 is output via lead 591 to VOB 306. Sampler 590 also controls the size of the output image as will appear.

Figure 26:
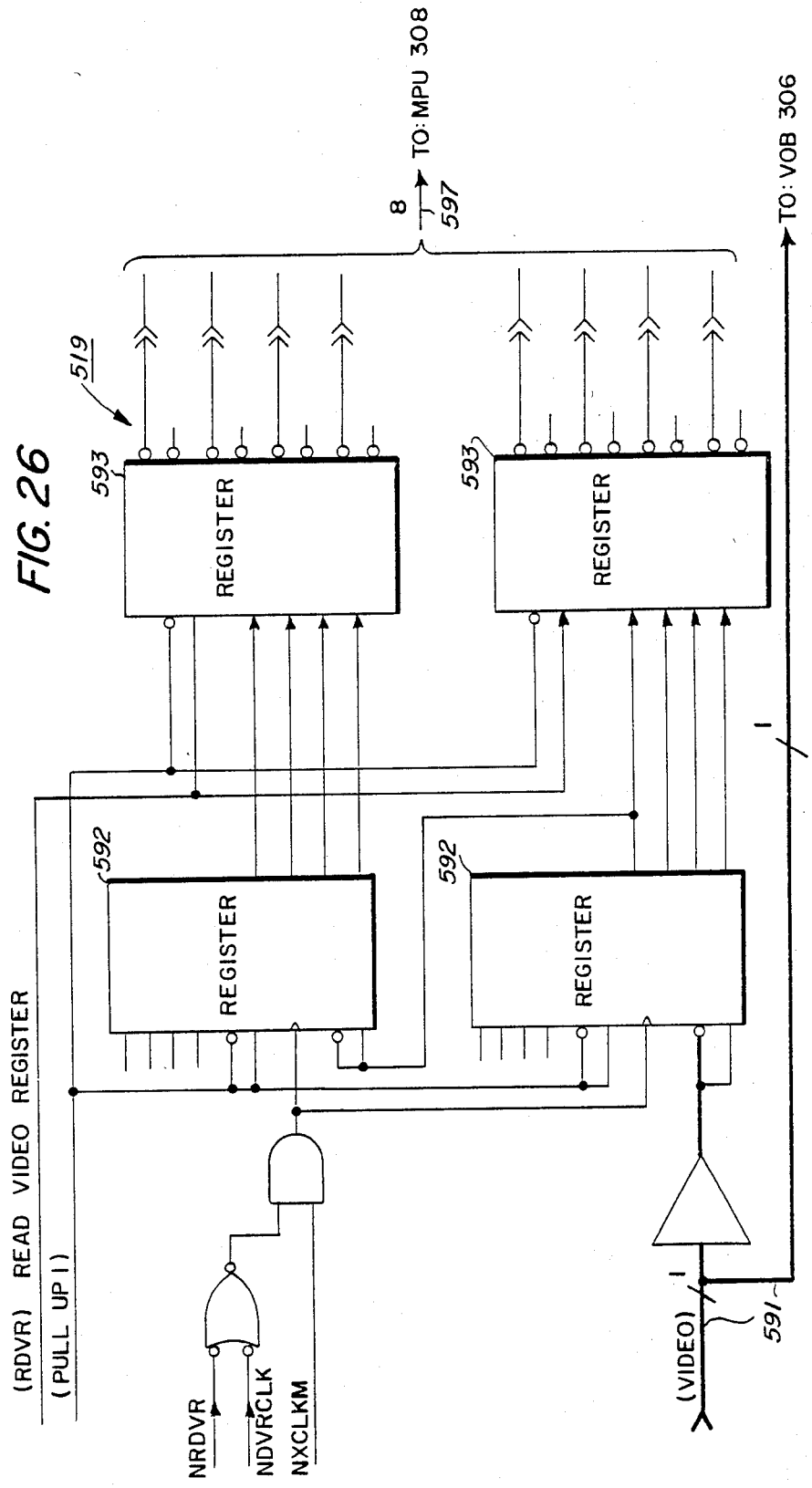
FIG. 26 is a schematic view of the IPM video output register.

Referring to FIG. 26, image signals from comparator 575 are also input to video register pairs 592,593 of serial-parallel converter 519 where the binary image signals are converted to parallel 8 bit image data. Image data from converter 519 is output through bus 597 to MPU 308 in response to a read signal (RDVR) from MPU 308.

Image signals output by sample and hold circuit 501 may be routed by selector switch 504 to lead 560 and A/D converter 520 when PICTORIAL ENHANCEMENT MODE is selected by the operator. Referring particularly to FIGS. 27–29 and 22, A/D converter 520, which may comprise a TRW Model TDC-100UA/D converter, serves to convert the analog image signals into 8 bits of digital information. Where the image data is output to VOB 306, the least two significant bits are dropped to provide a 6 bit output to VOB 306. Data output to MPU 308, normally for calibration or diagnostic purposes, is in 8 bit form. Image data output to either VOB 306 or MPU 308 is selected by switch 522. Switch 522 comprises A/D register pair 595 to which the image data from A/D converter 520 is output. Image data from A/D register pair 595 is output to VOB 306, and to MPU register pair 597. On a read signal (RDDR) from MPU 308, MPU register pair 597 provide single byte image data to MPU 308. Image data from video register pairs 592,593 (See FIG. 26) and from MPU register pair 597 is input to MPU for calibration, diagnostic, etc. purposes.

Figure 27:
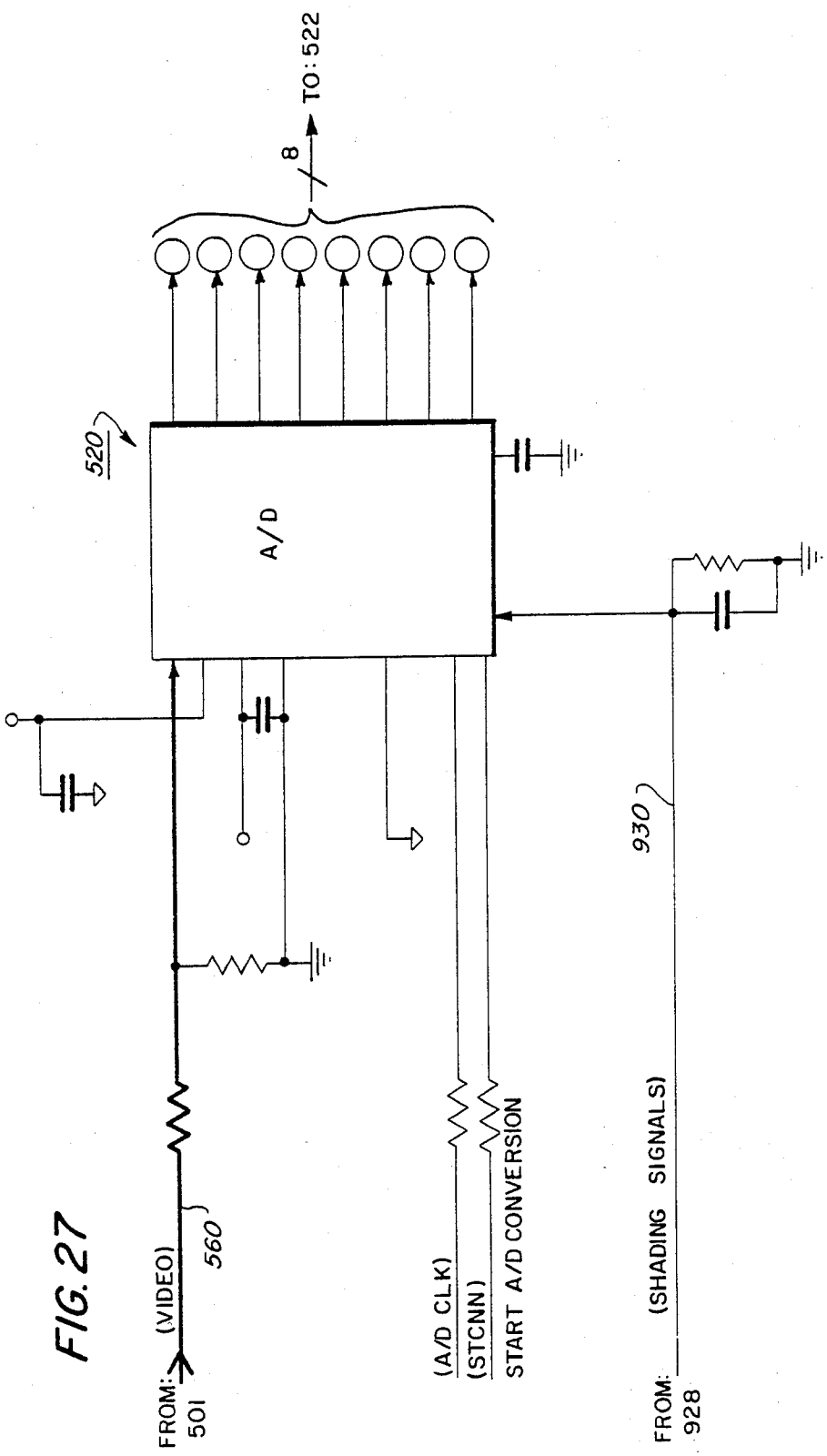
FIG. 27 is a schematic view of the IPM analog-to-digital (A/D) converter for providing image gray scale output.
Figure 28:
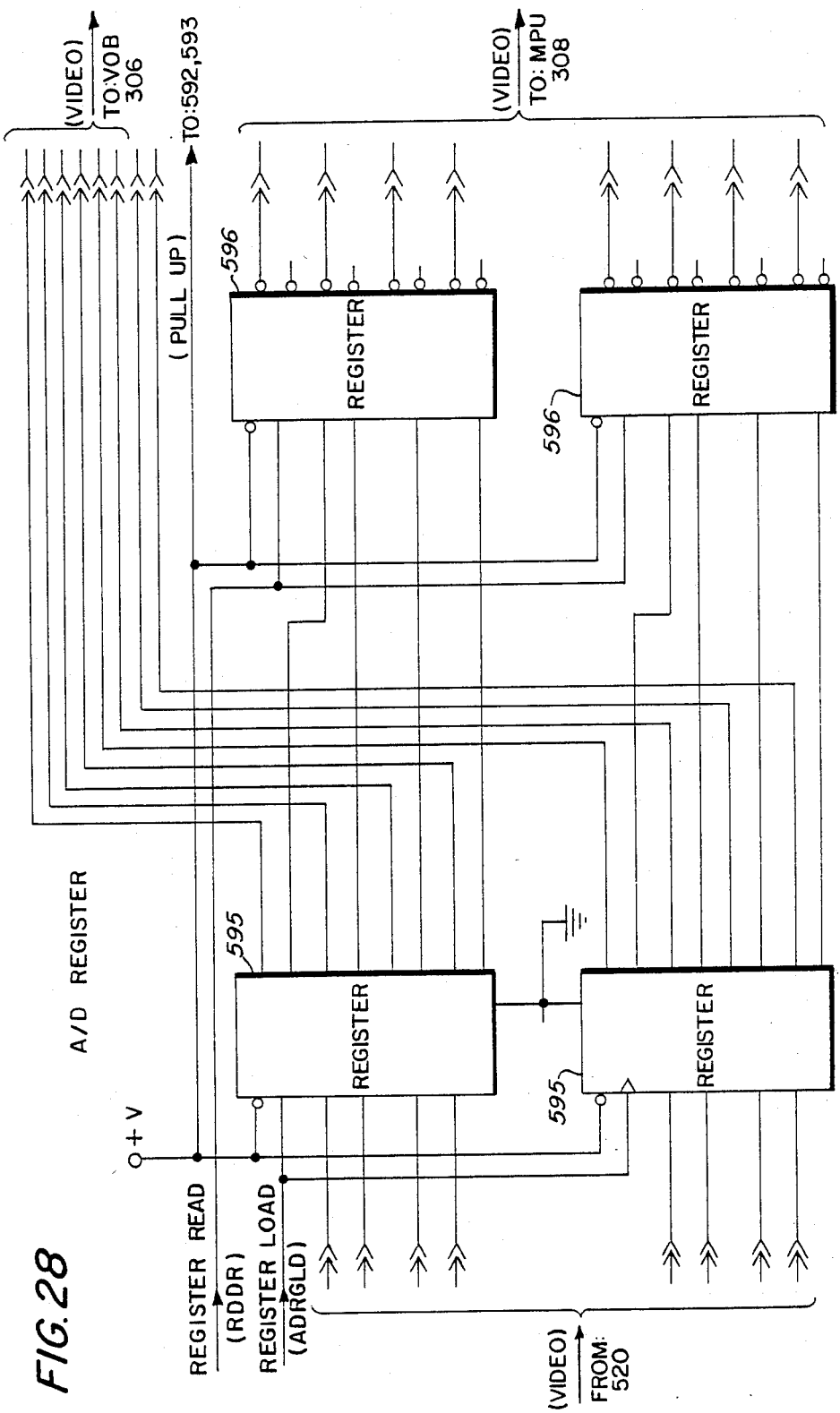
FIG. 28 is a schematic view of the A/D video output register for gray scale image data.
Figure 29:
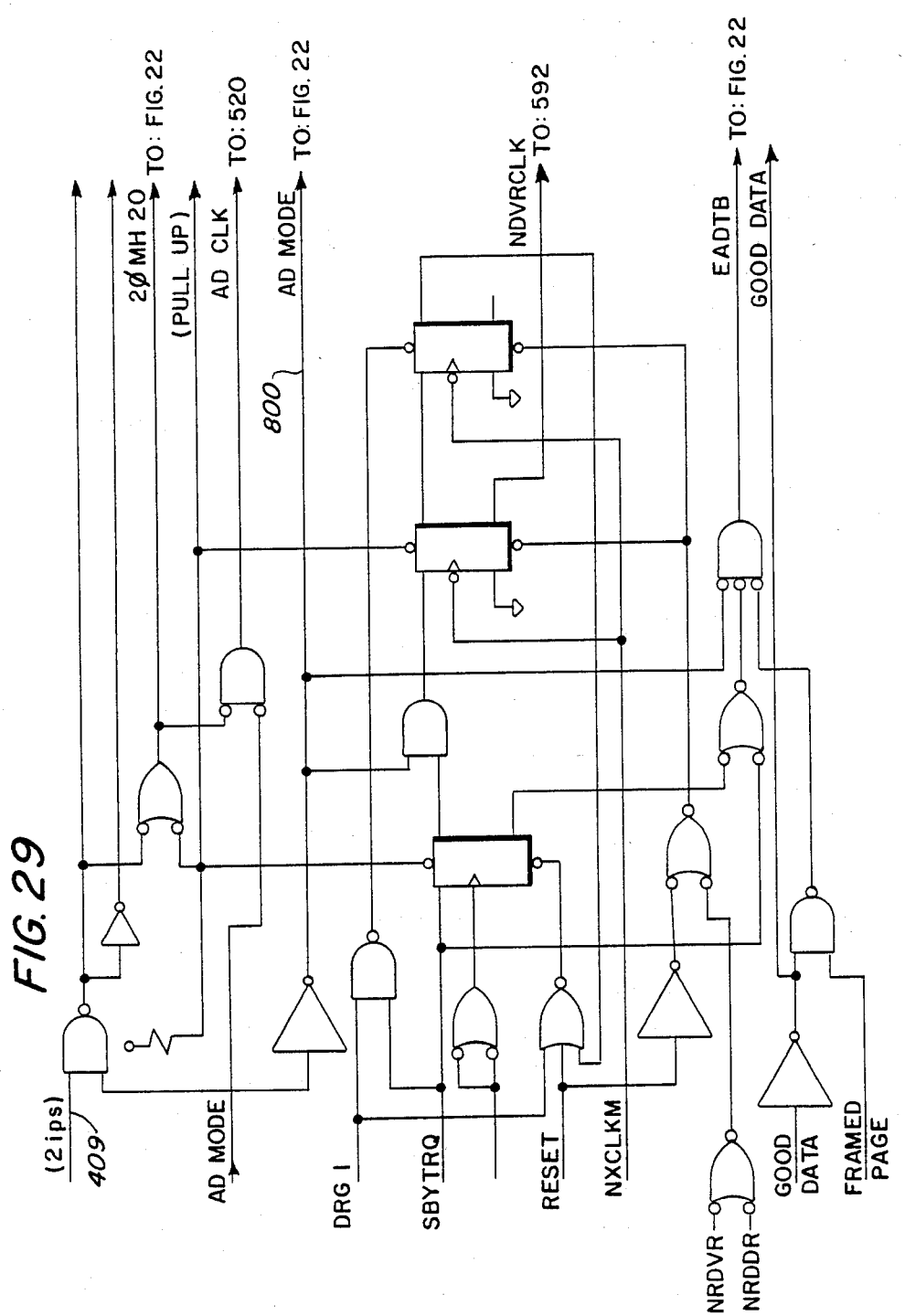
FIG. 29 is a schematic view of the control circuitry for the A/D converter shown in FIG. 27.

Referring particularly to FIGS. 22, 27, and 29 A/D converter 520 is enabled by a start A/D conversion signal (STCNN) responsive to establishment of the A/D time base (STADTB) and clocked at the low speed clock signal ($2\phi$MHZ) derived from output lead 409 of clock generator 400 (FIG. 18b). Clock driving pulses (A/D CLK) for A/D converter 520 are similarly derived from the low speed clock signal output of generator 400 in response to an A/D Mode input Signal from MPU 308.

Inasmuch as the operational speed of A/D converter 520 is limited, only image pixels up to a predetermined maximum pixel rate (i.e. 1 ips) can be converted by A/D converter 520. Where the input pixel rate is above the predetermined maximum rate, only selected pixels of each scan line may be converted.

MPU

Figure 30:
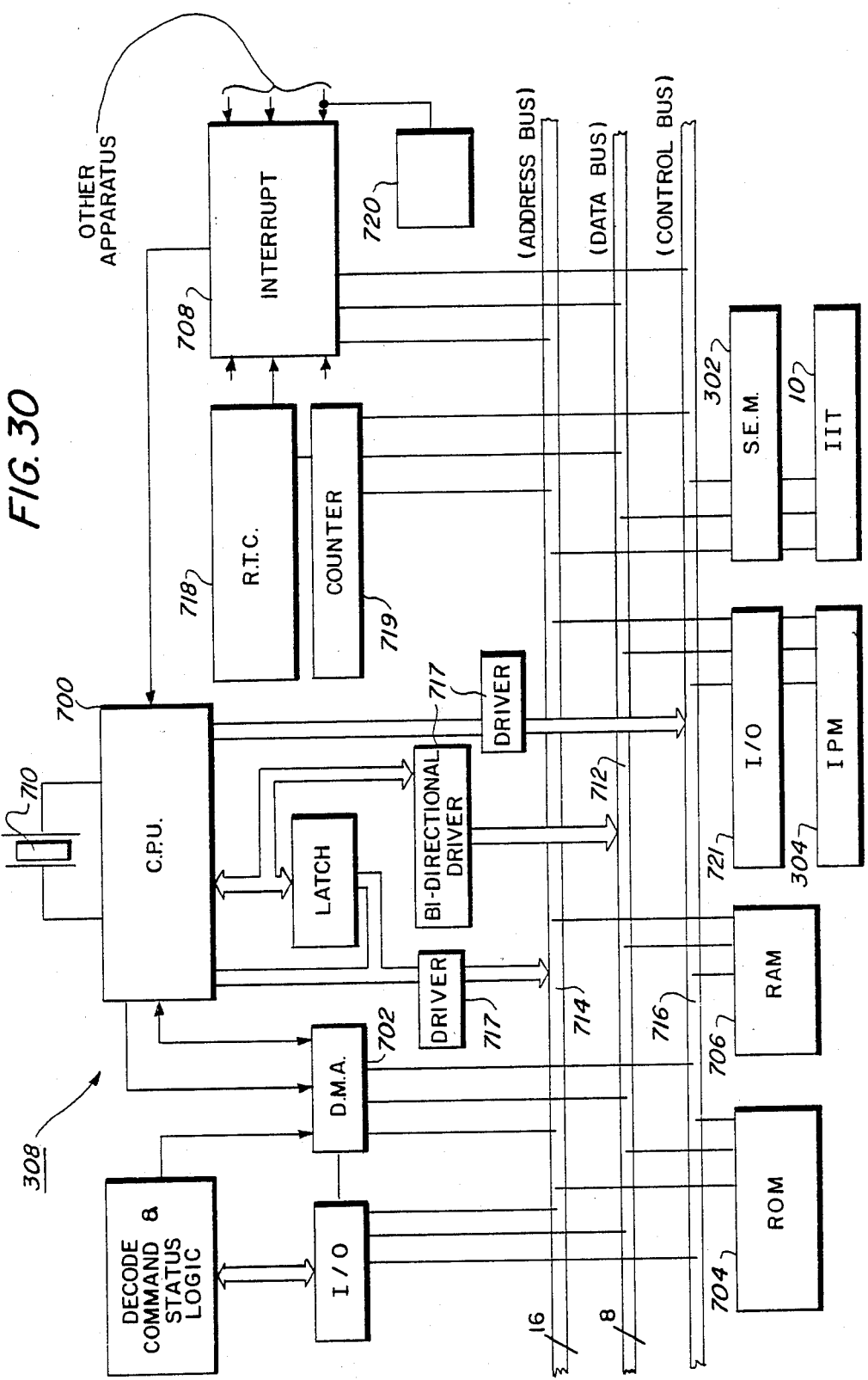
FIG. 30 is a schematic view showing elements of the MPU.

Referring to FIG. 30, MPU 308 controls the sequence of events in IIT 10 in accordance with a predetermined software program. MPU 308 includes a suitable CPU chip 700 such as an Intel Model 8085 CPU chip manufactured and sold by Intel Corporation, DMA controller 702, ROM memory 704, RAM memory 706, and interrupt controller 708. Crystal oscillator 710 provides clock signals for MPU 308 and for the Y scan servo loop speed reference (SPEED) of SEM 302. See FIG. 18a. Operating control software resides partially in ROM 704 with the remainder softloaded into RAM 706.

MPU 308 is interfaced with the various operating components that comprise IIT 10 via SEM module 302, and with IPM module 304 via IPM interface 721 through 8 bit bidirectional data bus 712, 16 bit address bus 714, and control bus 716. Suitable bus drivers 717 are provided.

Interrupt controller 708 serves to permit a routine in progress to be interrupted, and to preserve the environment of the interrupted routine with return to the point of interruption. Interrupt controller 708 also permits IIT 10 to be coupled with other apparatus (for example, data storage facilities, copy printer, etc.), the interrupt serving to control a DMA channel allocated for data and/or command transfers between IIT 10 and such other apparatus, to verify data received, and to interrupt and perform such data/unload commands, flags, etc. as may be required.

A second interrupt source, real time clock (RTC) software module 718 includes procedures for updating a 32 bit counter 719 at each interrupt, for computing the end time of an event by adding the count of counter 719 to a user specified value, comparing the RTC counter with a user specified time, and reading counter 719.

System control over IIT 10 is exercised by a software scheduler having procedures for initializing, scheduling, and transmitting various operational tasks or programs. Tasks which communicate with one another through system control tables are scheduled by calling a scheduler procedure and identifying appropriately the task to be scheduled. IIT 10 is controlled by entering commands at the operator's console or panel 309, or by commands from other associated units via a direct memory access (DMA) channel allocated therefor. Commands entered are interpreted and processed.

Operational control programs for IIT 10 include monitoring operator panel 309, operating scanner section 12 and document handler 14, analyzing instructions received, calibration, and system initialization. Additional software programs have control procedures for individual component initialization and verification, for loading and verifying halftone screen RAM 741, for shading, for MPU initialization and self test, and for bad pixel deletion.

IMAGE SCALING

Referring to FIG. 25b, IPM interface 721 includes address decoder 724 for decoding address data input thereto through address bus 714, the output of decoder 724 being input to AND gates 726, 727 and 747. Control signals from MPU control bus 716 are input to a second input of gates 726,727. The output of gates 726,727 regulate enablement of scale coefficient latch 731 and mode control latch 732 respectively. When triggered, the signal output of scale coefficient latch 731 sets the programmable multiplier of Binary Rate Multipliers (BRM's herein) 750,751 (FIG. 31) for the image pixel resolution and magnification selected by the user. Mode control latch 732, when triggered, provides the signal (AD mode) identifying the operational mode of IIT 10.

Figure 31:
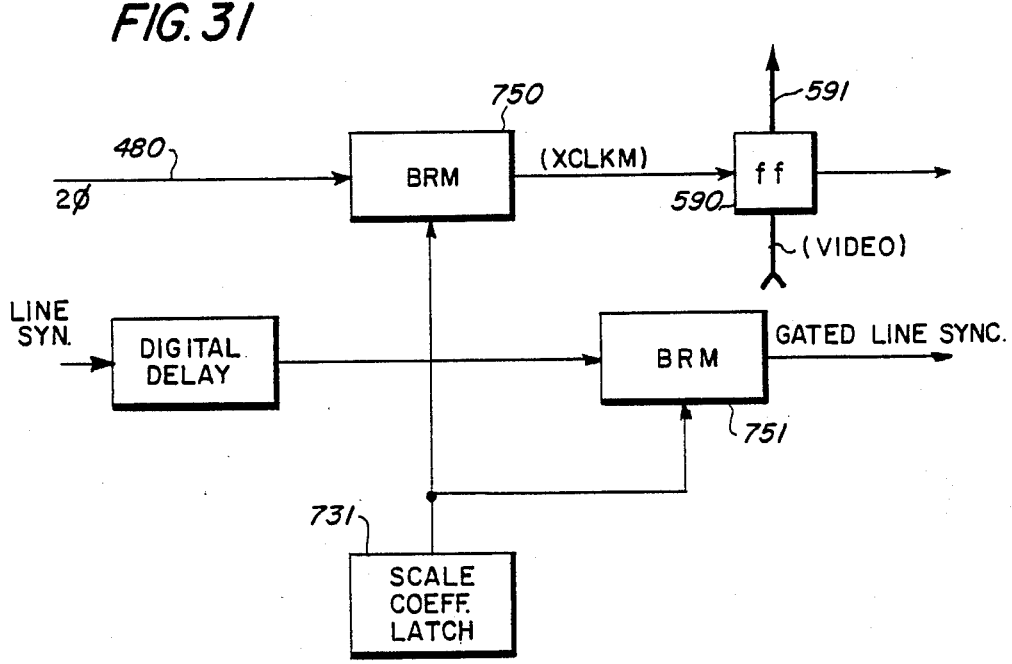
FIG. 31 is a schematic view of the image size controller.

Referring particularly to FIGS. 20 and 31, the signal outputs of scale co-efficient latch 731 controls the setting of BRM's 750,751 which in turn control both the image resolution, i.e. the number of pixels in each line and the number of lines and, therefore the image size. BRM 750, which controls the number of pixels in each scan line (i.e. the X dimension) has a clock signal $2\phi$ from SEM 302 corresponding to the maximum pixel rate per line input thereto. The output signal of BRM 750 (XCLKM) is input to sampler 590.

BRM 751, which controls the number of lines scanned (i.e. the Y dimension), has line clock signals (LINE SYNC), representing the maximum number of lines to be scanned, input thereto. The signal output of BRM 751 (GATED LINE SYNC) is input to X-scan boundary control 753 (FIG. 35).

It will be understood that BRM's 750,751 which may for example, comprise Texas Instrument's model 7497 BRM's each incorporate a programmable multiplier enabling a selected output frequency, which is a fraction of the input frequency, to be obtained, depending upon the control signal input. To provide the selected output frequency, BRM's 750,751 drop selective clock cycles from the input clock frequency.

To accomplish both X and Y dimension scaling, the nearest neighbor algorithm is applied. By applying an input CLK with frequency $\phi$ to a BRM, the output clock frequency $\phi_s$ is given by:

$$\phi s = (M \cdot \phi / 64)$$

where $0 \leq M \leq 63$ i.e. 6 bits binary coded. If two devices are cascaded, the output frequency is then:

$$\phi s = (M_1 \cdot \phi / 64) + (M_2 \cdot \phi / 4096)$$

Figure 34:
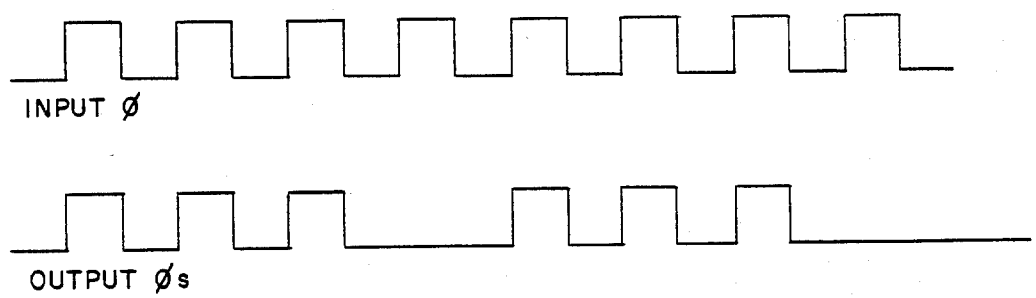
FIG. 34 is a timing diagram illustrating Binary Rate Multiplier (BRM) operation.

To realize the output clock frequency $\phi_s$, selected clock cycles of the input clock $\phi$ are dropped in a manner identical to the nearest neighbor algorithm. FIG. 34 illustrates an exemplary relationship between input and output clocks for an $M_1 = 48$ and $M_2 = 0$. This results in an output clock frequency of $\phi s = 0.75\phi$.

Applying the line sync clock to the input of BRM 751, the output clock (GATED LINE SYNC) will have selected cycles deleted. Gating the binary video output with this clock will, therefore, remove selected lines according to the programmed multiplier $M_1$ and $M_2$. In the example shown, every fourth line is deleted.

Applying a clock frequency of $2\phi$ to the X-dimension BRM 750, the output clock (XCLKM) will be the required clock, scaled from $2\phi$ for both X-dimension interpolation and image scaling. In the example shown, every fourth pixel is deleted.

VOB

Referring to FIG. 35, VOB 306 contains the image signal and line sync signal formatting functions in the form of differential pulse code modulator (DPCM) 754, serial to parallel binary video formatter 755, line sync signal and scan boundary control 753, and DPCM data formatting and 9-wire output interface 756.

DPCM 754 serves to compress the 6 bit digital data input from A/D converter 520 to 4 bits with subjectively inconspicuous error to provide a bit rate that corresponds with the speed limits of typical data storage devices. In addition, formatting the data in 4 bit nibbles simplifies transmission and further compression. The algorithm applied to accomplish DPCM is to compute a difference value $d_n$.

$$d_n = X_n - X_{n-1} - e_{n-1}$$

wherein
$X_n$ = present video sample value;
$X_{n-1}$ = previous video sample value;
$e_{n-1}$ = previous error in quantizing the value $d_{n-1}$; and
$e_n = q_n - d_n$ The difference value $d_n$ is then quantized to a value $q_n$ according to a preset mapping table. An exemplary mapping table is shown in Table I. Referring thereto, mapping is effected by mapping from the value $d_n$ in the first column (Difference) to the corresponding value $q_n$ in the third column (Quantization). The quantized difference value $q_n$ is mapped to a 4 bit nibble using the corresponding 4 bit $M_n$ in 4th column (4 bit code). As seen in Table I, the difference values $d_n$ with magnitudes larger than 32 are coded to the same $q_n$ values for both positive and negative values of $d_n$ to use the 4 bit codes more efficiently. Later decoding employs the equation $X_n = X_{n-1} + q_n$.

For the values of $q_n$ larger in magnitude than 32, adding the incorrect sign $q_n$ to $X_{n-1}$ will result either in a negative $X_n$ or in a larger than scale ($>64$) positive $X_n$ which are both physically incorrect. In this case both the positive and negative values of $q_n$ are added to $X_{n-1}$ and the value of $X_n$ that is positive and within the range (64) is chosen as the output for $X_n$. Both encoding and decoding algorithms presume initial zeros i.e. $X_{n-1}$, $e_{n-1}$ are initially zero for encoding and $X_{n-1}$ is zero for decoding respectively. The following example illustrates the algorithms.

Assume input samples are $X_0 = 10$, $X_1 = 54$ and $X_2 = 12$

Encoding: $d_0 = 10 - 0 = 10$ $q_0 = 11$ $e_0 = 1$ $M_0 = 0100$
$d_1 = 54 - 10 - 1 = 43$ $q_1 = 47$ $e_1 = 4$ $M_1 = 1110$ $d_2 = 12 - 54 - 4 = -46$ $q_2 = -47$ $e_4 = -1$ $M_2 = 1110$ Decoding: $M_0 = 0100$ $q_0 = 11$ $X_0 = 11 + 0 = 11$
$M_1 = 1110$ $q_1 = \pm 47$ $X_1 = 11 + 47 = 58$ $X_1 = 58$
(positive $<64$) or $X_1 = 11 - 47 = -36$ $M_2 = 1110$
$q_2 = \pm 47$ $X_2 = 58 + 47 = 105$ $X_2 = (105$ is $>64)$ or $X_2 = 58 - 47 = 11$ Thresholder 514, in LINE or PICTORIAL INPUT MODES provides 1 bit/pixel output. This data is formatted to 4 bit nibbles by formatter 755 which may comprise plural serial-to-parallel registers. Pixel clock $\phi$ is input to formatter 755 and similarly divided by 4. Both the formatted image and clock signals are output to interface 756.

Line Sync Signal and X-Scan Boundary Control 753 serves to delay the line sync signal 757 input to control 753 to provide a Delayed Line Sync Signal 758 delayed by a period equal to all the delays encountered in the video path i.e., from filtering, sampling, thresholding DPCM, etc. in each mode of operation. The delayed line sync signal 758, which synchronizes the output with valid data, is also used to determine the scan boundary in the X-dimension. This is accomplished by dropping the line sync signal 758 to logic zero at the actual end of a scan line. Scan boundary in the Y-dimension is determined by SEM 302 and the output.

Additionally, control 753 generates a switching signal 759 that divides the scan line output of DPCM 754 into two parts. This last function is applied only in the PICTORIAL ENHANCEMENT MODE.

For this purpose, each line of DPCM data (a scan line) is formatted into two equal parts using first in-first out (FIFO) buffer 760 and switch 761. The first half line is made equal to one half the scan line (in number of pixels), after which the line sync signal is dropped to logic 0 for a period of time equal to a few pixels. The line sync signal is then raised back to logic 1 indicating, the start of the next half line. On dropping of the line sync signal to logic 0, the output of DPCM 754 is coupled to buffer 760 by switch 761. Buffer 760 delays the image data comprising the one half line by a period equal to the period during which the line sync signal dropped to logic zero, avoiding any loss of image data.

By dividing the scan line into two equal parts, the number of bits per line is kept within the limit acceptable to the output.

For example, if the maximum number of pixels/line is 3440, X-dimension interpolation by interpolator 510 or 512 doubles the number of pixels to 6880 pixels/line. The output therefore is binary video (i.e., 1 bit/pixel) totaling 6880 bits/line.

In the PICTORIAL ENHANCEMENT mode, which uses DPCM 754, the number of pixels output is equal to the number of pixels scanned, i.e., 3440 per line. Since DPCM 754 provides 4 bits/pixel, the number of bits/scan line output by the DPCM is 13760 bits/line, which is double the number for the other operational modes. By dividing the scan line into two parts in this mode (PICTORIAL ENHANCEMENT MODE) each line part contains the same number of bits as a scan line in the other modes (LINE INPUT and PICTORIAL INPUT MODES).

TABLE I

| Difference ($d_n$) | DPCM LOOK-UP (6-4 bits) | | |
|---|---|---|---|
| | No. In Group | Quantization ($g_n$) | 4 Bit Code ($M_n$) |
| +63 | | | |
| +58 | 11 | +58 | 1111 |
| +47 | 11 | +47 | 1110 |
| +37 | 9 | +37 | 0111 |
| +28 | 9 | +28 | 0110 |
| +19 | 9 | +19 | 0101 |
| +11 | 7 | +11 | 0100 |
| +5 | 5 | +5 | 0011 |
| +2 | 1 | +2 | 0010 |
| +1 | 1 | +1 | 0001 |
| 0 | 1 | 0 | 0000 |
| −1 | 1 | −1 | 1000 |
| −2 | 1 | −2 | 1001 |
| −5 | 5 | −5 | 1010 |
| −11 | 7 | −11 | 1011 |
| −19 | 9 | −19 | 1100 |
| −28 | 9 | −28 | 1101 |
| −37 | 9 | −37 | 0111 |
| −47 | 11 | −47 | 1110 |
| −58 | 11 | −58 | 1111 |

Where the image signals output by ITT 10 exceeds the capability of the output device (as for example a storage disk) to assimilate the image signals, a suitable overload signal (not shown) indicating overload of the output device input sets ITT 10 into DEFAULT MODE. In this mode, a control signal from MPU 308 returns scan carriage 32 to home position to initiate a new scan at relatively slower speed. In the exemplary arrangement shown, scan carriage 32 is operated at a speed of 2 ips in the DEFAULT MODE with arrays 40,41 operated at 1 ips. Effectively, this results in arrays 40,41 scanning every other line to provide an output image resolution of 240 lines per inch by 240 pixels per inch.

CONTROLS

Control over scanning operation of ITT 10 and document handler 14 is exercised by MPU 308 in accordance with instructions from the user or operator through control panel 309. Referring to FIG. 18a, document handler 14 incorporates a cover interlock switch 780 for generating a document handler enabling signal when cover 24 thereof is closed. Where documents are to be manually fed, cover 24 of document handler 14 is raised (as shown in FIG. 11) opening interlock switch 780 and disabling document handler 14.

One or more document presence switches 782 are disposed adjacent document feed slot 210 and document handler 14 to detect insertion of a document to be fed therein. As described heretofore, documents to be fed are manually inserted into slot 210 following which document handler 14 advances the document into registered position on platen 28. In addition, one or more document jam switches (not shown) may be disposed at convenient places along the document path.

Operating control data from MPU 308 is distributed to motor 290, solenoids 225,260, and clutch 291 of document handler 14, and to exposure lamp 65 of IIT 10 through buffer 784. Buffer 784 is loaded with control data from MPU 308 through data bus 712 such that when a document has been inserted into feed slot 210 of document handler 14, solenoid 225 is actuated to drop fingers 216, start motor 290 and engage clutch 291. Motor 290 drives rollers 201, 202 and feed belt 230 to advance the document into registered position on platen 28. Following registration of the document, scan motor 39 is energized to move scan carriage 32 and scan the document. On completion of the scanning cycle, a signal from MPU 308 actuates solenoid 260 to drop registration gate 29, start motor 290 and engage clutch 291 to operate feed belt 230 and exit rollers 265,266 to remove the document from platen 28 and into output tray 267.

Figure 36:
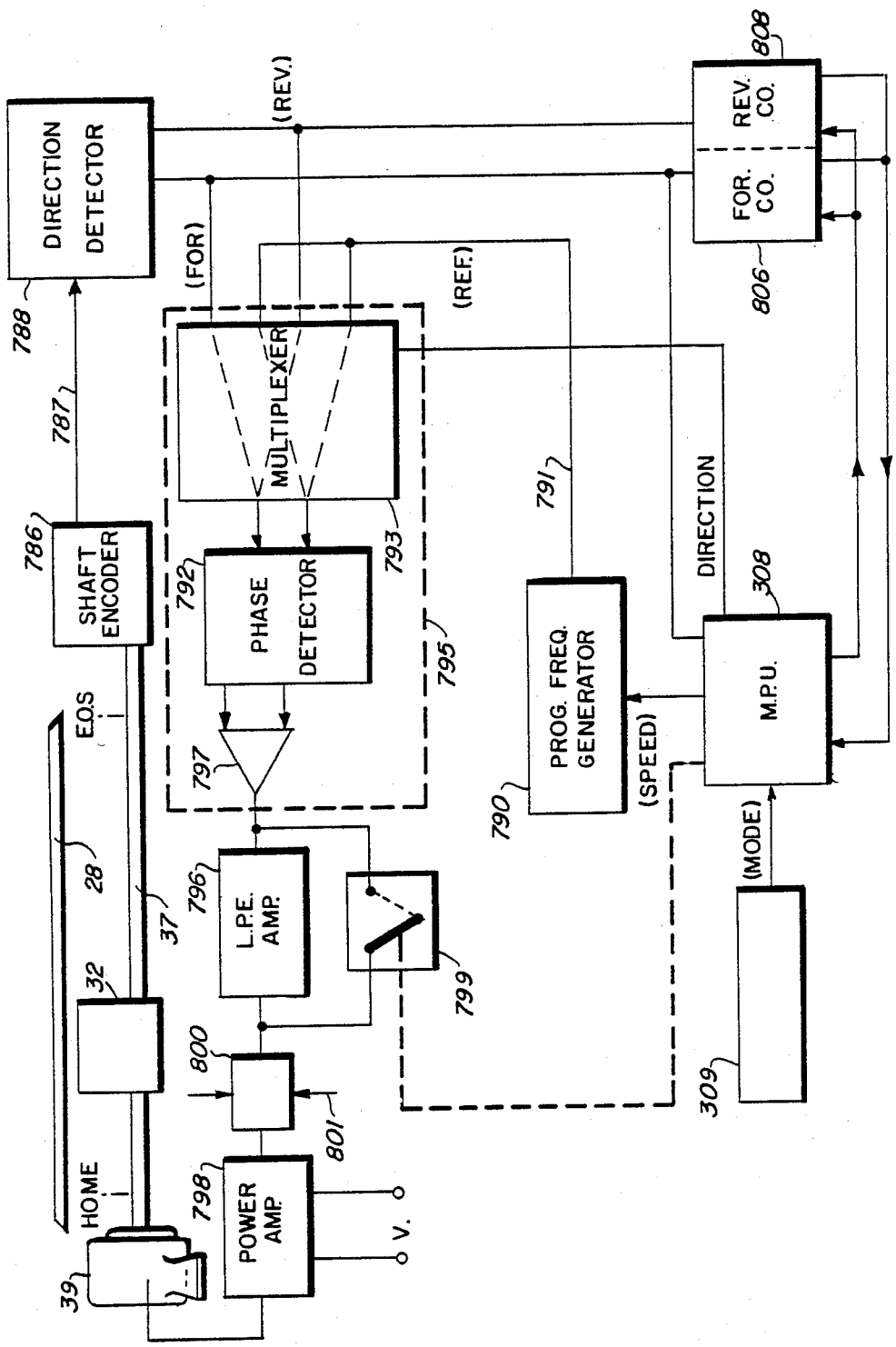
FIG. 36 is a block diagram of the scanning motor drive circuitry.

Referring particularly to FIGS. 18a and 36, an encoder 786 is provided on the output shaft of scan carriage motor 39. Encoder 786 generates quadrature, i.e. 90°, out of phase signals in lead 787 reflecting rotation of motor 39 in either a forward or reverse direction. Direction detector 788 uses the 90° phase relationship of the input signals from encoder 786 to determine the direction of rotation of motor 39 and hence the direction of movement of carriage 32, detector 788 providing either forward (FOR) or reverse (REV) control pulses to forward (SCAN) and reverse (RETURN) position counters 806,808 respectively. Forward (FOR) and reverse (REV) position counters 806,808 count down from a home position in preset increments (i.e. 1000 counts per inch of travel of scan carriage 32) from a maximum count, counters 806,808 being set to the maximum count at the carriage home position. To determine carriage home position, motor 39 is energized in the reverse (REV) direction to move carriage 32 backwards until the carriage abuts a carriage bumper (not shown). Counters 806,808 are then zeroed and set to the predetermined maximum count. As will be understood, the count on counters 806,808 reflects the position of carriage 32 which may be determined at any point during scan by subtracting the count on forward counter 806 from the count on reverse counter 808.

Programmable frequency generator 790 generates a frequency signal (REF) which is input via lead 791 and multiplexer 793 to phase detector 792 of phase lock loop 795 for phase locked motor operation. Multiplexer 793 is controlled by signals (DIRECTION) from MPU 308, multiplexer 793, during scan, coupling the forward (FOR) control pulses of direction detector 788 together with the forward reference signal (REF) to phase detector 792, and during carriage return, coupling the reverse (REV) control pulses of detector 788 together with the reverse reference signal (REF) to phase detector 788. As will appear, phase detector 792 compares the frequencies of forward (FOR) and reverse (REV) control pulses with the reference signal (REF) input by frequency generator 790. The frequency of the reference signal (REF) output by generator 790 is set by control signals from MPU 308 in response to the operational mode selected by the user. Generator 790 also serves as a variable duty cycle generator for open loop driver 794 (FIG. 18a).

Control over scan carriage motor 39 is exercised through phase locked loop section 795, the output of phase detector 792 thereof being input to adder 797 which sums the outputs of phase detector 792 in accordance with a predetermined formula. The signal output of adder 797 is input via loop filter 796 to power amplifier 798 controlling power input to motor 39. Loop filter 796 comprises a low pass active filter with predetermined gain (i.e. 2.5), filter 796 being tuned to roll off at 100 cycles to filter out transients.

In operation, a signal (DIRECTION) from MPU 308 sets multiplexer 793 in accordance with the direction in which scan carriage 32 is to move, i.e., in the forward (SCAN) direction. MPU 308 loads a succession of different frequency selecting signals, into frequency generator 790. Generator 790 responds by outputting to phase comparator 792 reference signals (REF) at the frequencies selected. For startup purposes, the first reference signal frequency is relatively low (i.e. 1 K.c.) with subsequent reference signals being increased stepwise in frequency. As the speed of scan carriage 32 approaches the operating speed desired, the frequency steps are reduced from relatively large (coarse) steps to relatively small (fine) steps.

Phase detector 792 compares the frequency of the reference signal (REF) from frequency generator 790 with the frequency of the signal representing the speed at which scan carriage 32 moves as determined by shaft encoder 786. Where a difference exists, an error signal is generated. The error signal is input through filter/amplifier 796 to power amplifier 798 to energize carriage drive motor 39. Motor 39 accelerates carriage 32 in the desired direction. The increase in the speed of carriage 32 in turn increases the frequency of the signal output by shaft encoder 786 until the frequency of the reference signal (REF) and the frequency of the signal from shaft encoder 786 match, at which point the error signal output by phase comparator 792 falls to zero interrupting power to motor 39.

The above procedure is repeated periodically (i.e. in intervals of 0.001 seconds) until scan carriage 32 reaches the desired operating speed. Thus, as scan carriage 32 accelerates, MPU 308 periodically steps up the frequency of the signal output by generator 790. Phase lock loop 795 responds to energize carriage drive motor 39 and accelerate carriage 32 until the carriage has been stepped through the speed plateaus represented by each successive reference signal to the final predetermined carriage speed.

It will be understood that the final carriage speed in the scan direction is dependent upon the operating mode selected as described heretofore. The return (RETURN) speed of scan carriage 32 is the same for all operating modes.

With scan carriage 32 at desired operating speed, and the frequency of the reference signal output by frequency generator 790 constant, phase lock loop 795 serves to maintain carriage 32 at the desired operating speed. Should scan carriage 32 slow, phase detector 792 detects the change in frequency between the signal output of shaft encoder 786 and the reference signal output by generator 790 and generates an error signal energizing motor 39.

As scan carriage 32 approaches the End of Scan (EOS), a signal from MPU 308 closes switch 799 to short out filter/amplifier 796 thereby providing a gain of zero. With gain set to zero, power to carriage motor 39 is interrupted, stopping scan carriage 32.

Phase comparator 792 may comprise a Motorola MC 4044 Phase Frequency Comparator which generates an output proportional to the phase or frequency difference between the encoder signal and the reference signal (REF) input by generator 790 while shaft encoder 787 may comprise a Model 992-500 OCLP manufactured by Disc Instruments. Counters 806,808 may comprise Intel 8253 16 bit down counters while adder 797 may comprise a 741 Differential Amplifier. Programmable frequency generator 790 preferably consists of a crystal clock and programmable counters.

When it is desired to operate scan motor 39 in an open loop fashion as for example during calibration, a signal in lead 801 activates a multiplexer 800 to switch from the output of phase lock loop section 795 to the output of open loop driver 794. The speed and direction of movement is controlled by a signal from MPU 308 via lead 803. Forward and reverse counters 806,808 permit MPU to monitor the position of scan carriage 32 as described earlier.

CALIBRATION

Figure 2:
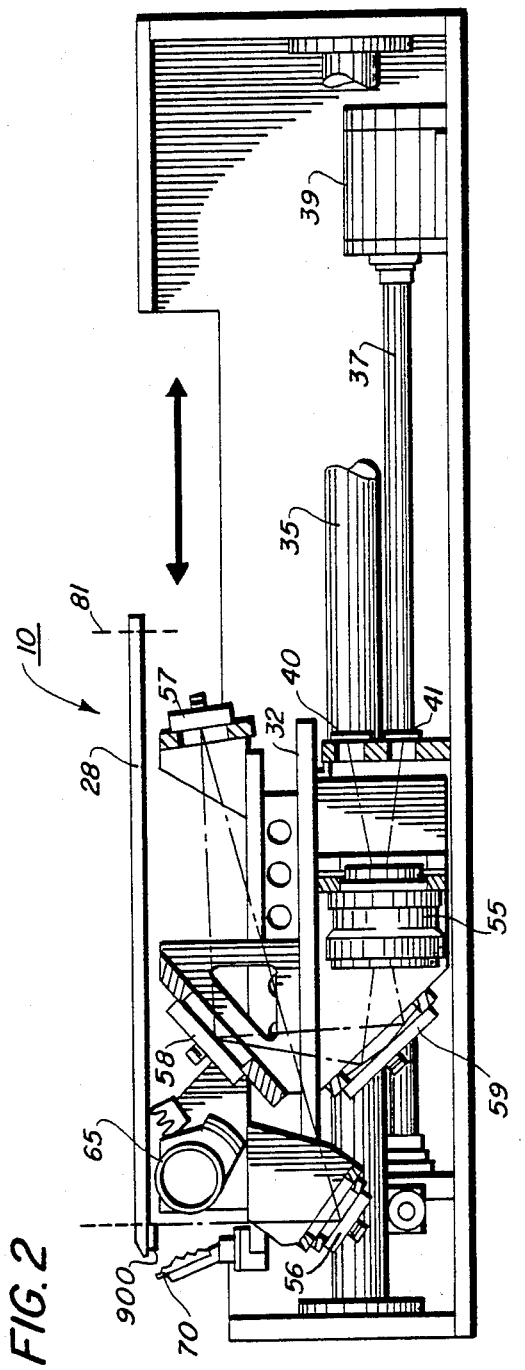
FIG. 2 is a side view in cross section of the IIT.
Figure 3:
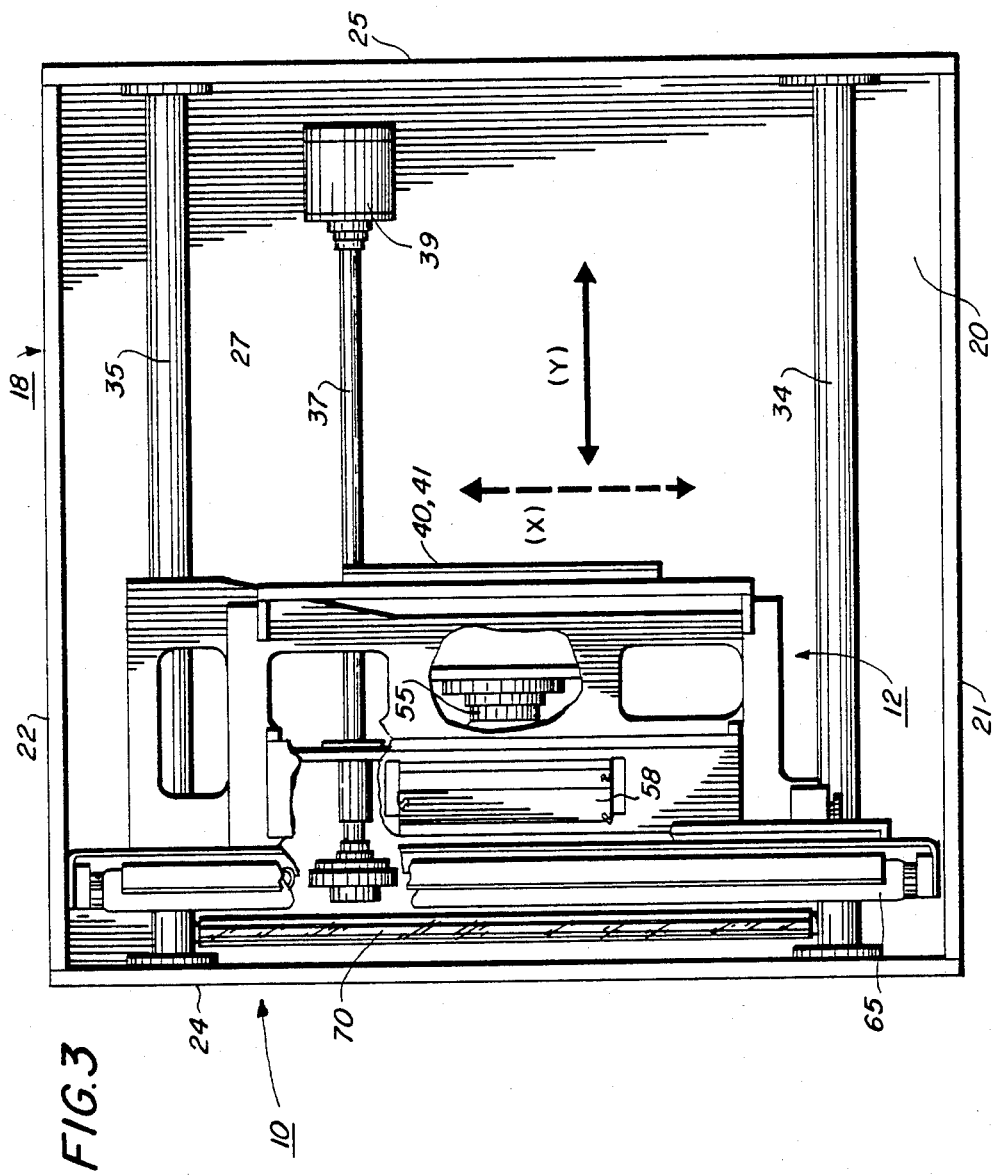
FIG. 3 is a top plane view of the IIT.
Figure 4:
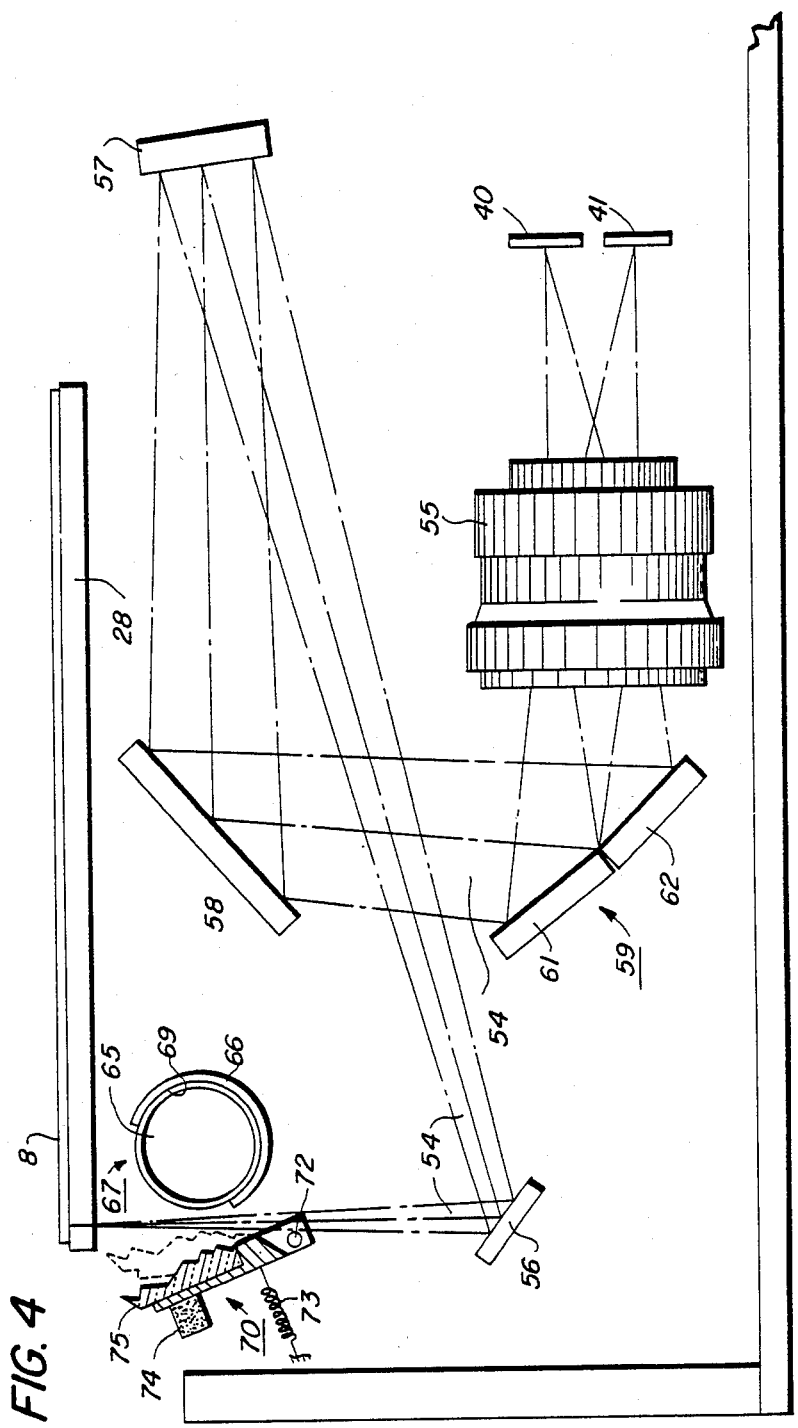
FIG. 4 is an enlarged view showing details of the optical system for the IIT.

Referring to FIG. 2, a reflective calibration strip 900 of predetermined reflectivity is mounted on platen 28 on the underside thereof along the platen leading edge. Disposition of calibration strip 900 on the underside of platen 28 provides a defocused image for arrays 40,41 and reduces interference of dust, dirt, scratches and other defects that may occur on the video calibration signal generated by arrays 40,41. Preferably the reflectivity of strip 900 is chosen to provide an optical signal equivalent to a 50 percent reflective document placed on platen 28.

The video calibration signals obtained from reading calibration strip 900 may be taken from either video output registers 593 of screen/threshold section 505 (FIG. 26) when calibrating IIT 10 for LINE INPUT and PICTORIAL INPUT MODES, or from video output registers 596 of AD section 506 (FIG. 28) when calibrating IIT 10 for PICTORIAL ENHANCEMENT MODE. It will be understood that the particular MODE calibrated is dependent upon the MODE selected by the operator. The video calibration signals are input to MPU 308 for processing.

Additionally, calibration video, which may be either fixed level video from MPU 308 or video calibration signals from VOB 306, may be introduced into IIT 10 to verify operation of IPM 504. Referring particularly to FIG. 20, selector switches 500,502 are preset by the user or operator to couple either MPU 308 or VOB 306 to sample and hold circuit 501 of IPM 504. The calibration video introduced into IPM 504 from either MPU 308 or VOB 306 is passed through digital-to-analog (D/A) converter 503 to convert the video signals from digital to analog.

A.G.C.

In order to correlate the image output levels of arrays 40,41 with one another, automatic gain control (AGC) is provided. The amount of gain required is determined by comparing the voltage output of arrays 40,41 when reading calibration strip 900 with a desired level or threshold value.

At startup before scan is initiated, scan carriage 32 is brought to the position where arrays 40,41 are disposed below calibration strip 900. Movement of carriage 32 into position where arrays 40,41 are opposite strip 900 is effected by the operator through suitable carriage forward (FOR) and reverse (REV) controls (not shown) on operator control panel 309 or automatically under program control. MPU 308 responds to produce the appropriate carriage forward or reverse signal (DIRECTION) to open loop driver 794 (FIG. 18b) to energize scan carriage drive motor 39 and move carriage 32 in the direction desired.

With arrays 40,41 disposed below calibration strip 900, strip 900 is scanned a plurality of times in each operational mode. As will be understood from the previous description, the video signals generated by arrays 40,41 pass through amplifiers 341 in signal channels 340,341 to crossover switch 350 of SB 300 (FIG. 17a, 17b). From SB 200, the video signals pass to IPM 304 and either A/D conversion section 506 and A/D registers 596 (FIG. 28), or to high speed interpolator 510 or low speed interpolator 512 (FIG. 20) and output registers 593 (FIG. 26) depending on the operational mode selected. From registers 596,593, the image signals may be input to MPU 308 in response to register read signals RDDR or RDVR.

The data derived from each array 40,41 is iteratively adjusted to obtain the optimum gain value for each array for each operational mode in accordance with a suitable program. In a preferred program, the output of D/A converters 912, 913 (FIG. 32) to amplifiers 341 of signal channels 340,341 in initially stepped up in relatively large increments (i.e. in blocks of 16) until the desired signal output gain is attained. Normally however, because of the coarse nature of the steps, the signal output of the amplifier 912 or 913 associated with the array 40 or 41 whose gain is being set, will exceed the signal output gain desired. The converter 912 or 913 is then stepped down in smaller increments (i.e. in blocks of 4) until the signal output gain equals or re-crosses the signal output level desired. The aforedescribed process continues with smaller and smaller increments until the signal output gain of the amplifier 912 or 913 for each array 40 or 41 equals the signal output gain desired.

The above process is carried out for each array 40,41 for each operational mode and the gain settings derived stored in RAM 706 (FIG. 30) for use during subsequent scanning operations.

In a preferred arrangement, the gain is determined by monitoring the signal output of the last four photosensitive elements before crossover of array 40 and the first four photosensitive elements after crossover of array 41. It will, however, be understood that other photosensitive elements or other groups of photosensitive elements may instead be used for this purpose.

Referring to FIG. 18b, AGC pulse generator 416 is driven by the clock pulse output of pixel counter 406. As described, counter 406 provides clock pulses for clocking out image pixels from arrays 40,41. MPU 308 generates at the desired pixel count, an enabling signal activating pulse generator 416. The signal output pulses of generator 416 (RDVR; RDDR) enables video output registers 593 (FIG. 26) or 596 (FIG. 28) respectively to input image data from registers 593 or 596 to MPU 308, depending upon the operational mode selected.

In the example alluded to heretofore (FIG. 17), where crossover from array 40 to array 41 takes place at pixel count 1724, MPU 308 actuates AGC pulse generator 416 at pixel count 1720 through 1728 to transfer image pixels from the last four photosensitive elements of array 40 together with the first four photosensitive elements of array 41 to MPU 308.

MPU 308 averages the block of image pixels from each array and compares the averaged signals with a predetermined signal or threshold level. A gain signal representing the difference between the calibration image pixels and the predetermined signal level is produced for each array.

Referring to FIG. 32, the gain signal from MPU 308 is input to D/A converters 912,913 for arrays 40,41 respectively. D/A converters 912,913 convert the digital gain signal output by MPU 308 to an analog signal which is input via leads 915,916 respectively to amplifiers 341 of the signal processing channels 330,331 associated therewith (FIG. 17b). The gain signal serves to regulate the amplitude ratio or gain of amplifiers 341 to provide a uniform image signal level from each array.

On each scan, arrays 40,41 scan across calibration strip 900 to provide updated gain control information to MPU 308 prior to scanning the document 8 on platen 28. The updated calibration signals generated by the last four photosensitive elements of array 40 and the first four photosensitive elements of array 41 are input to MPU 308 where, as described, the calibration signals from each array are averaged to provide an updated gain signal for each array 40,41. The updated gain signals are input to RAM 706 to update the existing gain signals stored therein.

Since scan carriage 32 is moving relative to calibration strip 900 when updating of the gain control signals is taking place, the interval within which corrections in gain level can be made is limited. This in turn restricts the number of adjustments in gain level that can be made per array. In the exemplary arrangement shown, the interval is such that only changes in gain setting of one step can be made. However, as long as any drift or change in array performance is relatively minor, the aforedescribed updating will maintain the desired array operating level. If a substantial change in array performance takes place, several scans may be required before the desired gain level is restored.

SHADING

Figure 33:
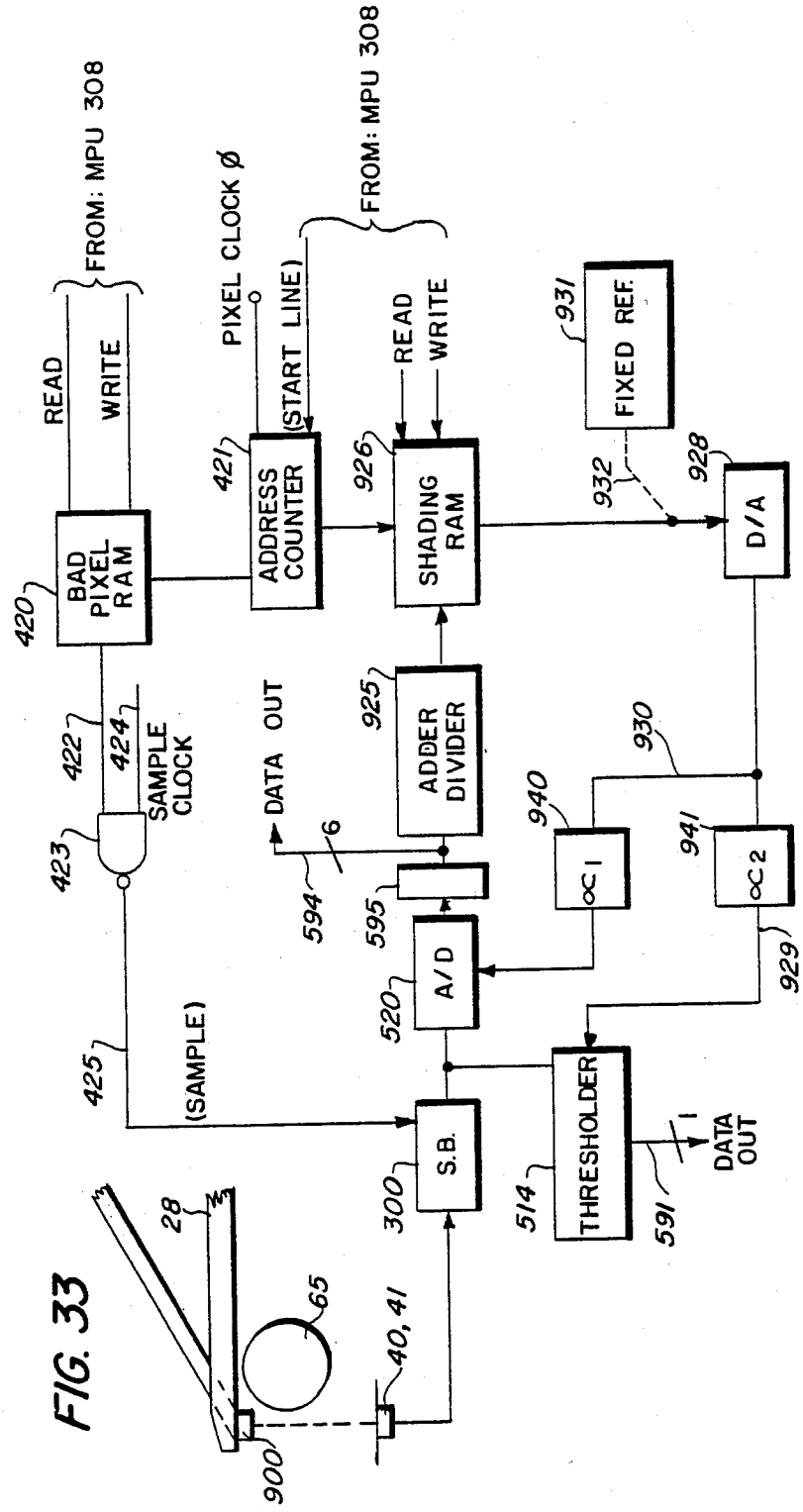
FIG. 33 is a schematic view of the shading and bad pixel deletion logic.

The image data obtained from scanning calibration strip 900 is also employed to compensate the video image output signals of arrays 40,41 for illumination system profile irregularities such as may be caused by cosine 4th law, profile of scanning lamp 65, vignetting, etc. Referring particularly to FIG. 33, the aforesaid compensation, termed Shading herein, takes image pixels produced by scanning calibration strip 900 from A/D video register 595 in blocks of predetermined size (i.e. 16) and inputs the pixels to adder/divider circuit 925 which provides an average pixel value representative of the pixel block. The averaged pixels or shading signals are stored in Shading RAM 926 for later use on a write signal from MPU 308.

During operation, the contents of Shading RAM 926 are cyclically addressed by address counter 421, which is enabled at the start of scan (START LINE) to sequentially address the shading signals held therein. Counter 421 is driven in synchronism with the stream of image pixels by pixel clock $\phi$. A read signal (READ) from MPU 308 enables RAM 926 for this purpose.

The shading signals from shading RAM 926 are input to D/A converter 928 (FIG. 24) which converts the digital shading signals to analog signals. The output of D/A converter 928 is input via lead 929 to D/A converter 517 of thresholder 514 (shown in FIG. 24) where the shading signals are, in effect, multiplied by the analog threshold/screen signals output by converter 517, and via lead 930 to A/D converter 520 (shown in FIG. 27) of A/D section 506 where the shading signals are, in effect, multiplied by the input image signals.

To accommodate for differences between A/D converter 520 and thresholder 514, a proportionality constant is introduced in the shading signals output by D/A converter 928. For this purpose, attenuating circuits 940,941, which comprise suitable resistor networks are disposed in leads 930,929 respectively. Attenuating circuits 940,941 serve to multiply the shading signal output by D/A converter 928 by a preselected proportionality constant.

Where desired, i.e. for test purposes, a source 931 of digital shading signals may be provided with manually controlled selector switch 932 for selectively coupling shading signal source 931 with D/A converter 928.

BAD PIXEL DELETION

As can be understood, certain photosensitive elements 312 in the multitude of photosensitive elements that comprise arrays 40,41 may be or become inoperable or below par. In this situation, the image signal output by the affected photosensitive element or elements may be faulty, or have sensitivity characteristics significantly different from the image signals output by neighboring photosensitive elements. To identify and accomodate bad or faulty photosensitive elements, a bad pixel deletion control is provided. As described, SEM 302 (FIG. 18b) supplies a control signal (SAMPLE) to sample and hold circuit 339 on SB 300. Referring to FIG. 17b, in normal operation, one sample signal is generated for each video image signal and triggers sample and hold circuit 339 which samples and holds the video image signal input thereto for a preset time interval in output lead 340. Capacitor 345, which is coupled to output lead 340, charges each time to a voltage level corresponding to that of a sampled video image signal.

The bad pixel deletion control interrupts input of the control signal (SAMPLE) to sample and hold circuit 339 to prevent circuit 339 from sampling the next video image signal. In this condition, the previous video image signal output by sample and hold circuit 339, which is held on capacitor 345, forms the video image signal output to differential amplifier 341.

To identify bad or faulty elements, calibrating strip 900 is scanned in each of the LINE INPUT, PICTORIAL INPUT, and PICTORIAL ENHANCEMENT MODES, and the image data output to MPU 308. MPU 308 compares the image signal output of each photosensitive element of arrays 40,41 with a predetermined minimum voltage level or threshold. Where the image signal is above the minimum threshold value, and hence acceptable, a binary signal (i.e. 1) is loaded into bad pixel RAM 420 (FIG. 18b) by MPU 308. Where the image signal is below the minimum threshold value and hence unacceptable, a binary signal (i.e. 0) is loaded into RAM 420. In the calibration mode, MPU 308 generates a write (WRITE) signal enabling data to be loaded into RAM 420.

During scanning operation, a read signal (READ) from MPU 308 enables reading of the data stored in RAM 420. Address counter 421 which is driven by pixel clock signals from pixel counter 406 and is reset at the start of scan of each line by a signal (START LINE) from MPU 308, sequentially addresses RAM 420 and the control data therein. The output of RAM 420 is input through lead 422 to AND gate 423. A sample signal is periodically generated by event timer 410 and input to gate 423 through lead 424. The output of gate 423 (SAMPLE) is input to sample and hold circuit 339 through lead 425.

Where the signal input from Bad Pixel RAM 420 is high (i.e. 1), AND gate 423 is enabled and on a pixel clock signal $\phi$, gate 423 is triggered to generate a sample (SAMPLE) signal in lead 425 to SB 300. As described, the sample (SAMPLE) signal triggers S/H circuit 339 to sample the next video image signal.

Where the signal input from Bad Pixel RAM 420 is low (i.e. 0) indicating a "bad" photosensitive element, gate 423 remains in a blocking condition to prevent output of a sample (SAMPLE) signal. As a result, the previous image signal, which is retained by capacitor 345, is output.

While the invention has been described with reference to the structure disclosed, it is not confined to the details set forth, but is intended to cover such modifications or changes as may come within the scope of the following claims:

What is claimed is:

1. In a raster input scanner, the combination of:
   (a) multiple speed scanning means for scanning originals to provide image signals representative of the image on said originals, said scanning means being selectively operable at a first scanning rate for predominantly line images and at a second scanning rate for other images;
   (b) first image processing means for procesing image signals produced by said scanning means at said first scanning rate to provide a binary level image signal output;
   (c) second and third image processing means for processing image signals produced by said scanning means at said second scanning rate;
      said second image processing means being adapted for use when said other images comprise predominantly continuous tone images, said second image processing means providing a binary level image signal output;
      said third image processing means being adapted for use when said other images comprise halftone and/or continuous tone images, said third image processing means providing a digital signal output representing the gray scale level of the image signals processed; and
   (d) selector means for selecting one of said scanning means first and second scanning rates, and one of said second and third image processing means when said second scanning rate is selected.

2. The scanner according to claim 1 in which said first and second image processing means includes interpolation means for multiplying said image signals by a predetermined factor to provide additional ones of said image signals whereby to increase resolution of the output image.

3. The scanner according to claim 2 in which said interpolation means includes scaling means for deleting selected ones of said image signals to reduce the size of said output image.

4. The scanner according to claim 1 in which said first and second image processing means includes thresholding means for thresholding image signals processed by said first and second image processing means.

5. The scanner according to claim 4 in which the threshold level of said thresholding means for said first image processing means is fixed.

6. The scanner according to claim 14 in which said second image processing means includes means to vary the threshold level of said thresholding means.

7. The scanner according to claim 4 in which said second image processing means includes screen means for screening the image signals processed by said second image processing means.

8. The scanner according to claim 1 including document feeder means for bringing originals to be scanned into operative relation with said scanning means.

9. The scanner according to claim 8 including:
   (a) a transparent platen for supporting originals to be scanned; and
   (b) drive means for moving said scanning means past said platen to scan an original on said platen;
   (c) said document feeder means bringing one original at a time onto said platen and following scanning by said scanning means removing said original to clear said platen for the next original.

10. The scanner according to claim 9 including register means for locating originals to be scanned in predetermined position on said platen.

11. The scanner according to claim 1 in which said first and second image processing means includes scaling means for deleting selected ones of said image signals to change the size of the output image.

12. A method of processing image bearing originals, the steps which comprise:
   (a) where the original image is made up of predominantly lines, scanning said line image at a relatively high speed to provide a binary level signal output representing said line image;
   (b) where the original image is made up predominantly of continuous tones, scanning said continuous tone image at a relatively slow speed to provide a binary level signal output representing, said continuous tone image;
   (c) multiplying said binary level signal outputs by a predetermined factor to provide additional binary level signals to enhance image resolution;
   (d) selectively varying the number of image signals that comprise said binary level signal output to vary selectively image size;
   (e) where the original is made up predominantly of halftones, scanning said halftone image at said relatively slow speed to provide a digital signal output representing the gray level content of said halftone image; and
   (f) converting said binary level signal output and said digital signal output to signals having the same bit size.

* * * * *